US008693359B2

(12) United States Patent
Imai et al.

(10) Patent No.: US 8,693,359 B2
(45) Date of Patent: Apr. 8, 2014

(54) COMMUNICATION CONTROL DEVICE AND COMMUNICATION QUALITY MEASUREMENT METHOD

(75) Inventors: Mitsuhiro Imai, Yokohama (JP); Junichi Kimura, Koganei (JP)

(73) Assignee: Hitachi, Ltd., Tokyo (JP)

( * ) Notice: Subject to any disclaimer, the term of this patent is extended or adjusted under 35 U.S.C. 154(b) by 770 days.

(21) Appl. No.: 12/979,830

(22) Filed: Dec. 28, 2010

(65) Prior Publication Data

US 2011/0216661 A1 Sep. 8, 2011

(30) Foreign Application Priority Data

Mar. 2, 2010 (JP) ................................. 2010-045015

(51) Int. Cl.
*H04L 12/26* (2006.01)

(52) U.S. Cl.
USPC .......................................... 370/252; 370/241

(58) Field of Classification Search
USPC .......................................................... 370/252
See application file for complete search history.

(56) References Cited

U.S. PATENT DOCUMENTS

2007/0280108 A1 12/2007 Sakurai
2008/0107060 A1 5/2008 Andou et al.

FOREIGN PATENT DOCUMENTS

| JP | 2001-244938 A | 9/2001 |
| JP | 2004-228746 A | 8/2004 |
| JP | 2004-343243 A | 12/2004 |
| JP | 2005-223453 A | 8/2005 |
| JP | 2006-246118 A | 9/2006 |
| JP | 2007-235681 A | 9/2007 |
| JP | 2007-324783 A | 12/2007 |
| JP | 2008-118525 A | 5/2008 |

OTHER PUBLICATIONS

H. Schulzrinne, et al., "RTP: A Transport Protocol Real-Time Applications", Standard Track RFC 3550, Jul. 2003, pp. 1-106.
Japanese Office Action dated Jan. 29, 2013 (two (2) pages).

*Primary Examiner* — Shripal Khajuria
(74) *Attorney, Agent, or Firm* — Crowell & Moring LLP

(57) ABSTRACT

Disclosed is a communication control device for measuring the delivery quality of unicast/multicast video delivery by a user premises device. The communication control device connects a first network to a second network. The first network is connected to a delivery server for delivering data packets containing plural pieces of content. The second network is connected to a plurality of computers for acquiring the data packets from the delivery server. The communication control device acquires control information that is transmitted from the computers to the delivery server, extracts computer identification information and data packet identification information from the acquired control information, and measures the delivery quality of data packets targeted for measurement, which are to be transmitted to the identified computers, in accordance with the extracted computer identification information and the extracted data packet identification information.

16 Claims, 14 Drawing Sheets

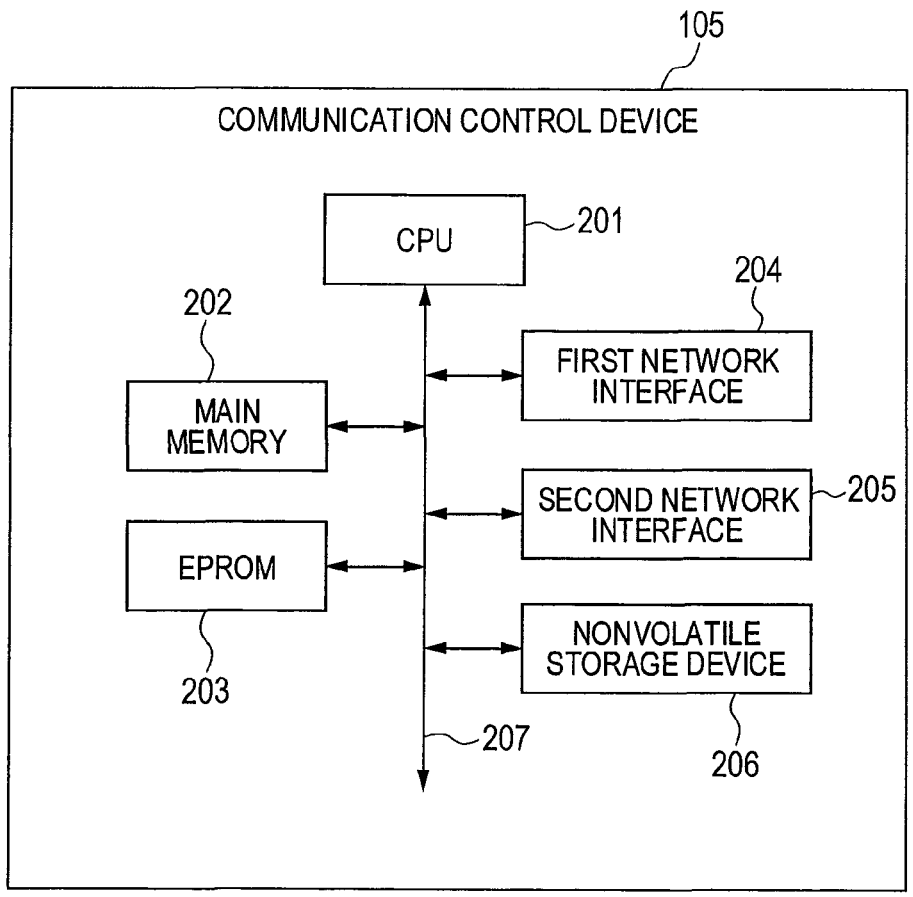

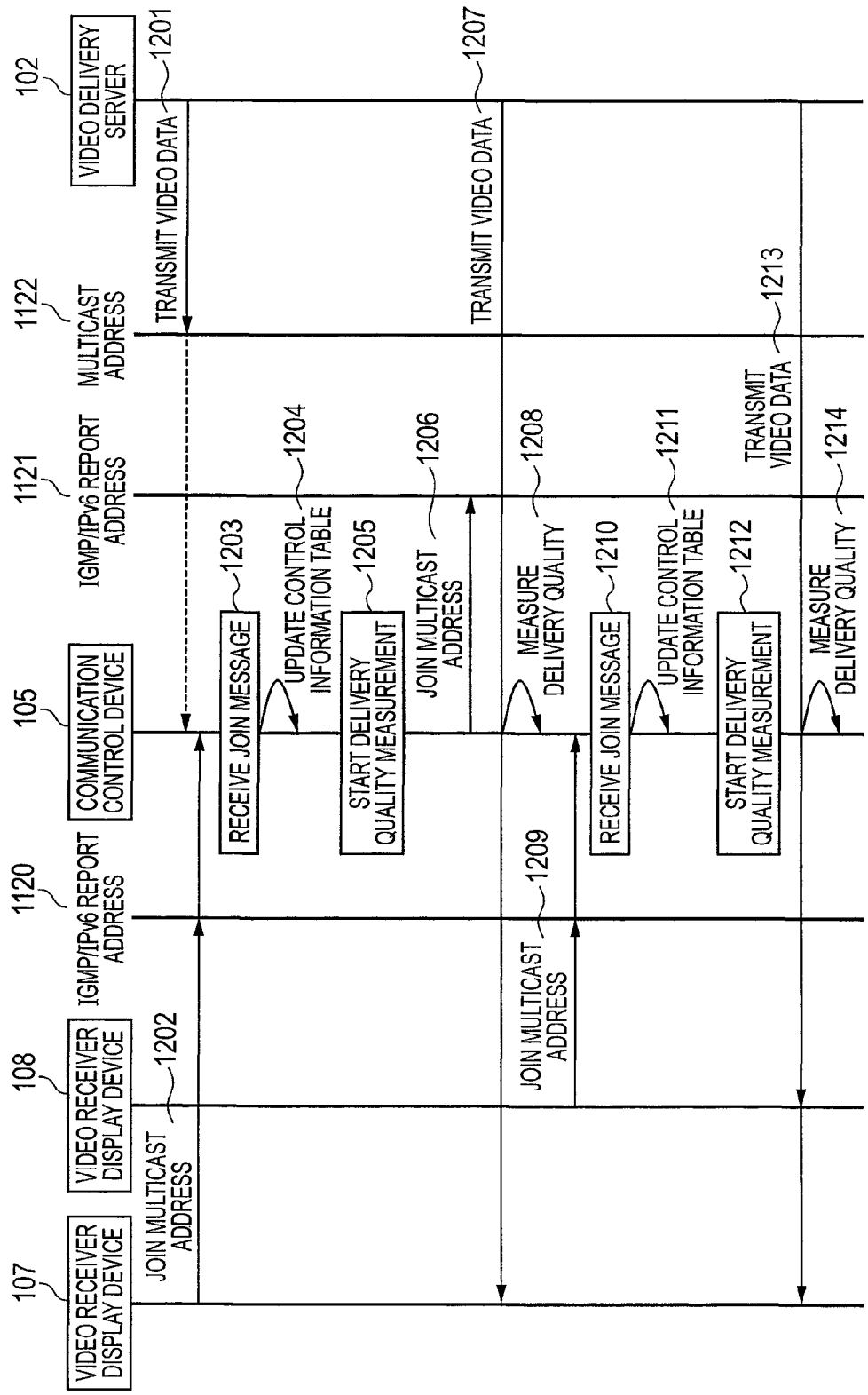

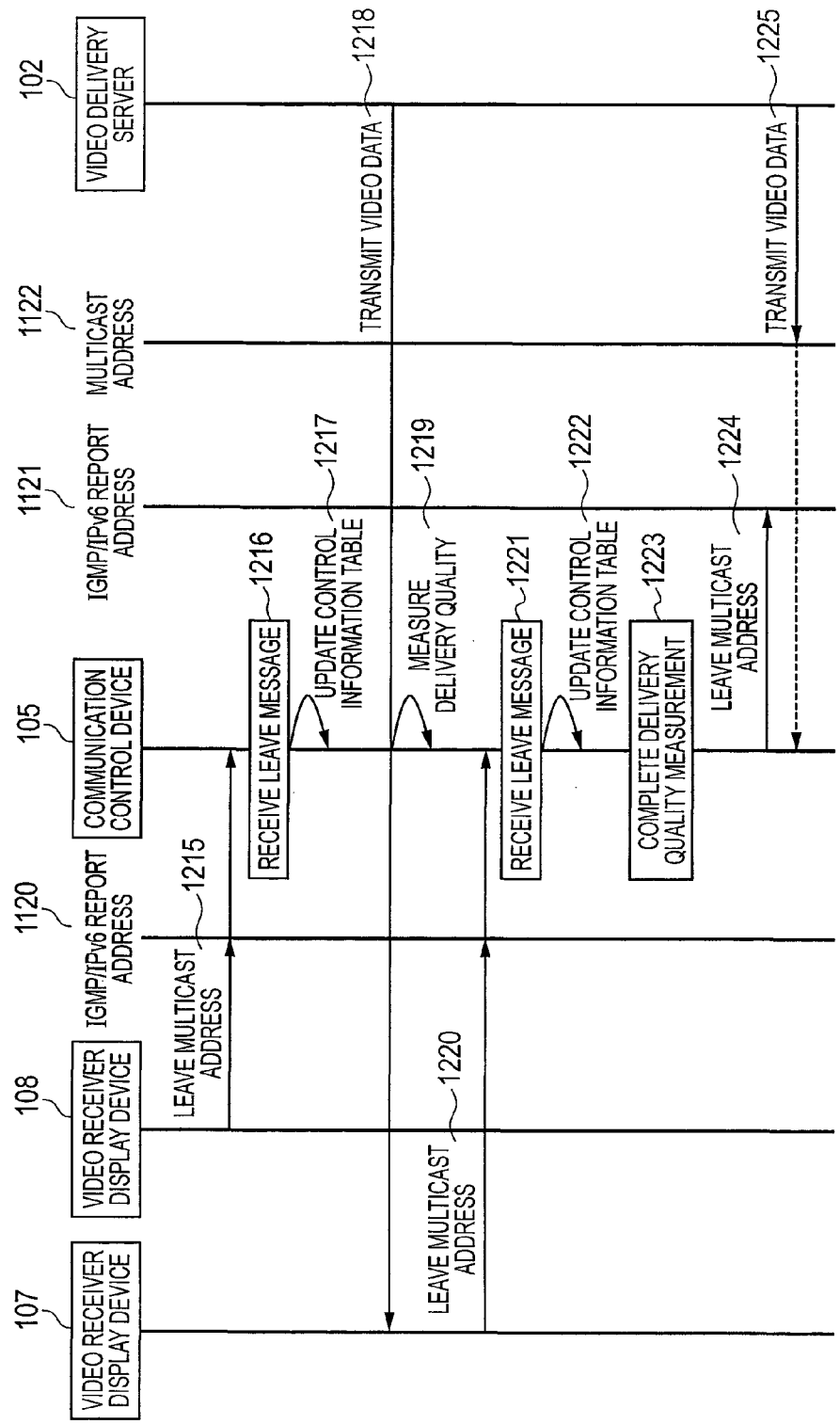

FIG. 10

PORT FORWARDING INFORMATION TABLE 300

| ITEM NUMBER 301 | COMMUNICATION CONTROL DEVICE PORT 302 | VIDEO RECEIVER DISPLAY DEVICE IP ADDRESS 303 | VIDEO RECEIVER DISPLAY DEVICE PORT 304 |
|---|---|---|---|
| 1 | 20112 | 192.168.1.101 | 10234 |

FIG. 13

QUALITY MEASUREMENT INFORMATION TABLE 900

| VIDEO DATA PACKET IDENTIFICATION INFORMATION 901 | DELIVERY QUALITY INFORMATION 902 |
|---|---|
| 224.10.10@133.144.1.1:10234 | LOSS:12/10005,AVG_LATENCY:52ms,AVG_JITTER:10ms — 903 |
| 224.10.10@133.144.1.1:10236 | LOSS:8/5034,AVG_LATENCY:48ms,AVG_JITTER:13ms — 904 |
| [ff03::a:1]@[2003::a:1]:12346 | LOSS:24/20035,AVG_LATENCY:32ms,AVG_JITTER:24ms — 905 |

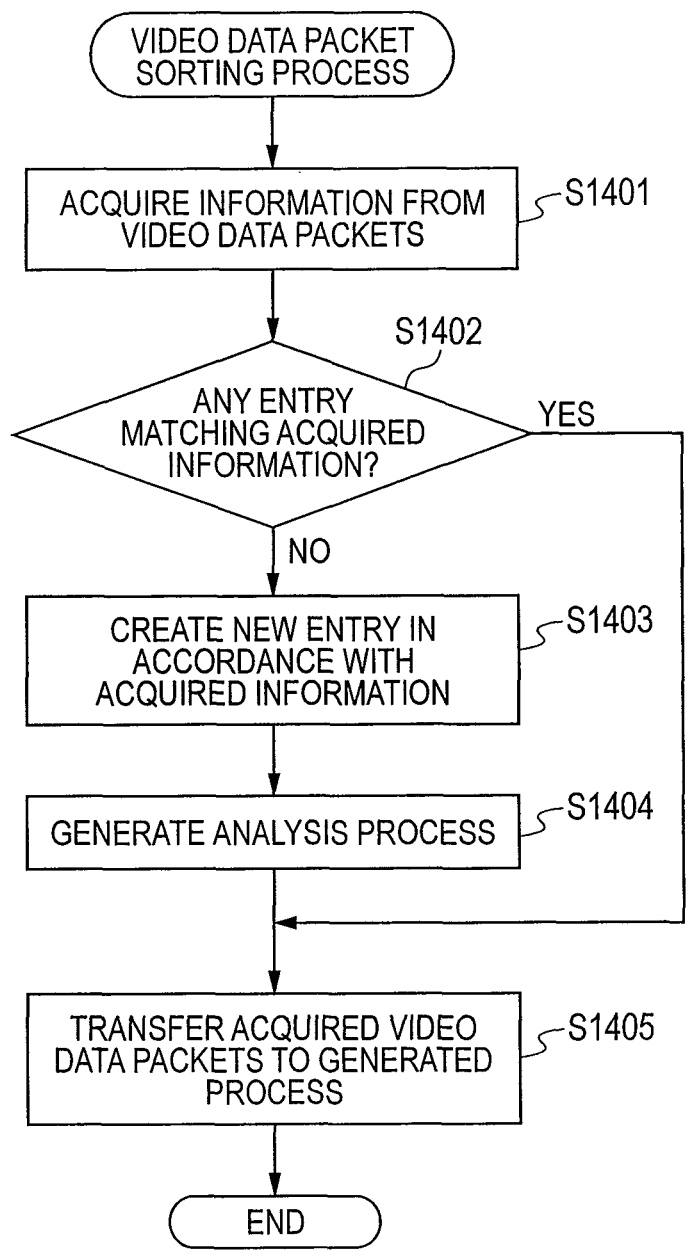

COMMUNICATION CONTROL DEVICE AND COMMUNICATION QUALITY MEASUREMENT METHOD

CLAIM OF PRIORITY

The present application claims priority from Japanese patent application JP 2010-045015 filed on Mar. 2, 2010, the content of which is hereby incorporated by reference into this application.

FIELD OF THE INVENTION

The present invention relates to a communication control device and a communication control method. More specifically, the present invention relates to a communication control device and a communication control method that are used to measure video delivery quality, such as packet loss, of unicast or multicast video content delivery based on Real-time Transport Protocol (RTP).

BACKGROUND OF THE INVENTION

Due to widespread use of broadband networks, network-based video content delivery services are expanding by using, for instance, a PC, networked TV (IPTV), or set-top box (STB) as a client terminal.

Either a unicast delivery method or a multicast delivery method is used to deliver video content through video content delivery services. In unicast delivery, a video content delivery server delivers content in accordance with a request from a client terminal on a one-to-one basis. In multicast delivery, on the other hand, the video content delivery server delivers content to many client terminals simultaneously.

In unicast or multicast delivery, RTP (Real-time Transport Protocol) is generally used because the video content delivery server has to transmit video data to a network in accordance with a video bit rate.

RTP, as the name implies, is a network protocol that excels in real-time processing required for video content delivery. However, RTP is usually implemented over UDP (User Datagram Protocol). Therefore, RTP does not permit the video content delivery server to confirm whether video data transmitted from it has arrived at a client terminal.

As such being the case, a communication protocol such as RTP Control Protocol Receiver Report (RTCP RR) is defined as described, for instance, in RFC 3550 "RTP: A Transport Protocol for Real-Time Applications," IETF, 2003, page 42. This communication protocol measures the delivery quality of video data received by a client terminal and notifies, for instance, a video content delivery server of the measured delivery quality.

A method disclosed in JP-A-2005-223453 provides protection against spoofing, DoS attacks, unauthorized program transmission, and the like by installing a gateway at a connection point between an external IP network such as the Internet and an internal IP network such as a LAN, and constantly monitoring whether the transmission rate of data packets passing through the gateway is unduly high for a data type reported by a preceding call control packet. If the transmission rate of a data packet is higher than a predetermined value, this method discards succeeding packets or destroys analog data in the data packet to be relayed, without being discarded, to the LAN or other internal network by using a noise pattern that does not affect the listening process of a human.

SUMMARY OF THE INVENTION

The method described in RFC 3550 "RTP: A Transport Protocol for Real-Time Applications," IETF, 2003, page 42 has the following problems.

When RTCP RR is used to measure the delivery quality of video data received by a client terminal, the delivery quality, such as packet loss, is measured at a client terminal on user premises. Therefore, the measured delivery quality is affected by the configuration of a network on the user premises. If, for instance, a low-speed wireless LAN is used as a video data transmission path on the user premises, the loss of packets within the wireless LAN is also recorded as measured data about delivery quality.

In recent years, an NGN (Next Generation Network) has been introduced as a high-quality communication network. However, a communication carrier offering the NGN can control the communication quality of only data packets passing through the NGN.

When the delivery quality of video data is to be measured through the NGN, RTCP RR, which is a conventional communication protocol, measures the delivery quality including the communication quality prevailing on user premises, as mentioned earlier. Therefore, RTCP RR cannot measure the delivery quality prevailing at an entrance to the user premises, that is, at the exit of the NGN, which is the communication carrier's demarcation point of responsibility for the user. Consequently, when a complaint is filed by a user of a video content delivery service, it is difficult to use the measured delivery quality as effective delivery quality measurement data.

To prevent a LAN on user premises from receiving illegal data from a WAN, which may be caused, for instance, by RTP-based spoofing, DoS attacks, or unauthorized program transmission, the method disclosed in JP-A-2005-223453 investigates the reception of data packets transmitted from the WAN by using control information transmitted from the WAN to the user premises LAN. Therefore, control information transmitted from the user premises LAN need not be used to investigate the reception of data packets from the WAN.

However, the present invention relates to a communication control device that is capable of receiving, for instance, a multicast or unicast video content delivery, and investigates a WAN's communication environment prevailing in a path to a user premises LAN. If the communication control device does not receive a connection request or information identifying a connection destination for the reception of a video content broadcast, the communication control device cannot identify data packets to be investigated.

The present invention provides a communication control device that is installed between a user premises network and an external network to measure the delivery quality prevailing in a path to an entrance to the user premises network, which is a communication carrier's responsibility demarcation point, by measuring the delivery quality of unicast or multicast video data packets.

According to a representative aspect of the present invention, there is provided a communication control device that connects a first network to a second network. The communication control device includes a first processor, a first memory connected to the first processor, and a first network interface connected to the first processor. The first network is connected to a delivery server that includes a second processor, a second memory connected to the second processor, and a second network interface connected to the second processor, and delivers data packets containing plural pieces of content. The second network is connected to plural computers that each include a third processor, a third memory connected to the third processor, and a third network interface connected to the third processor, and acquire the data packets from the delivery server. The communication control device acquires control information, which is to be transmitted to the delivery server in order to let the computers acquire the data packets from the delivery server, extracts computer identification information, which identifies the computers targeted for measuring the delivery quality of the data packets to be transmitted, and data packet identification information, which identifies the data packets to be measured and transmitted to the identified computers, from the acquired control information, and measures the delivery quality of the data packets targeted for measurement, which are to be transmitted to the identified computers, in accordance with the extracted computer identification information and the extracted data packet identification information.

According to an embodiment of the present invention, the communication control device connected between the first network and the second network can measure the delivery quality of a unicast or multicast content delivery service such as packet loss, packet latency, and packet jitter. This makes it possible to measure the delivery quality prevailing between the communication control device and the first network, which is a communication carrier's responsibility demarcation point.

BRIEF DESCRIPTION OF THE DRAWINGS

An embodiment of the present invention will be described in detail based on the following figures, wherein:

FIG. 2 is a block diagram illustrating an exemplary hardware configuration of a communication control device according to an embodiment of the present invention;

FIG. 3 is a diagram illustrating an example of a control information table according to an embodiment of the present invention;

FIG. 7A is a sequence diagram illustrating processing steps for multicast delivery quality measurement according to an embodiment of the present invention;

FIG. 7B is a sequence diagram illustrating processing steps for multicast delivery quality measurement according to an embodiment of the present invention;

FIG. 10 is a diagram illustrating an example of a port forwarding information table according to an embodiment of the present invention;

FIG. 13 is a diagram illustrating an example of a quality measurement information table according to an embodiment of the present invention; and FIG. 14 is a flowchart illustrating in detail an RTP packet sorting process according to an embodiment of the present invention.

DETAILED DESCRIPTION OF THE PREFERRED EMBODIMENTS

An embodiment of the present invention will now be described with reference to the accompanying drawings.

Figure 1:
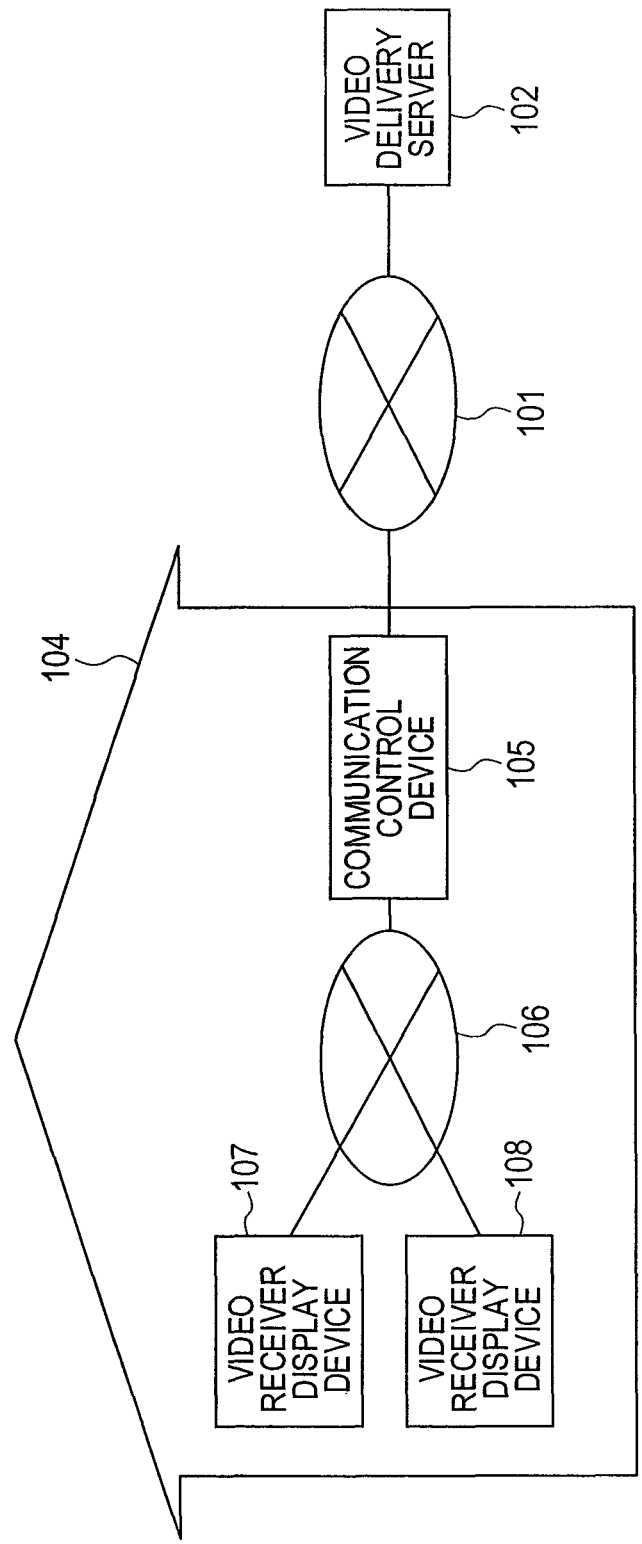
FIG. 1 is a diagram illustrating an exemplary configuration of a network according to an embodiment of the present invention.

FIG. 1 is a diagram illustrating an exemplary configuration of a network according to an embodiment of the present invention.

As shown in FIG. 1, the network according to the present embodiment includes a video delivery server 102, a communication control device 105, and video receiver display devices 107, 108.

The video delivery server 102 is connected to the communication control device 105 through a network 101 such as a Next Generation Network (NGN) so that information can be exchanged between these devices when a predetermined procedure is followed. The network 101 includes at least one backbone router (not shown).

The communication control device 105 and the video receiver display devices 107, 108 are interconnected through a user premises network 106 installed on user premises 104 so that information can be exchanged when a predetermined procedure is followed.

The communication control device 105, which is connected to both the network 101 and the user premises network 106, can function as a gateway that permits a device installed on the user premises 104 to exchange information with a device connected to the network 101. The communication control device 105 will be described in detail later with reference to FIG. 2.

The video receiver display devices 107, 108 are, for example, network-ready TVs, personal computers, or set-top boxes, and each include, for instance, a CPU (not shown), a main memory (not shown), a nonvolatile storage device (not shown), an input device (not shown), a display device (not shown), and a network interface (not shown).

The video delivery server 102 includes at least one computer. The computer included in the video delivery server 102 includes, for instance, a CPU (not shown), a main memory (not shown), a nonvolatile storage device (not shown), an input device (not shown), a display device (not shown), and a network interface (not shown). The nonvolatile storage device stores Real Time Streaming Protocol (RTSP), Internet Group Management Protocol (IGMP), Real-time Transport Protocol (RTP), and other video content delivery protocols as programs that are to be loaded into the main memory and executed by the CPU.

In the present embodiment, the communication control device 105 needs to properly select video data packets from all packets exchanged between the user premises network 106 and the network 101, and analyze the selected video data packets in order to measure delivery quality of video data packets that are transmitted through the network 101 and received by the video receiver display devices 107, 108.

In order to measure the communication quality of the video receiver display devices 107, 108 and other devices installed on the user premises 104, the communication control device 105 needs to exercise management while the video data packets to be subjected to delivery quality measurement are linked with information identifying the video receiver display devices 107, 108 on the user premises 104.

To fulfill the above-described needs when measuring the delivery quality of video data packets transmitted to the video receiver display devices 107, 108, the communication control device 105 according to the present embodiment acquires unicast or multicast video delivery control information transmitted from the video receiver display devices 107, 108.

Further, the communication control device 105 analyzes the acquired control information, extracts information (A) identifying a video receiver display device 107, 108, information (B) identifying the video data packets to be subjected to delivery quality measurement, information (C) about a video delivery start request, and information (D) about a video delivery completion request, and measures the delivery quality of the video receiver display device to be measured that prevails between the start and completion of video delivery.

In the subsequent description, the control information transmitted from the video receiver display devices 107, 108 is simply referred to as the control information.

FIG. 2 is a block diagram illustrating an exemplary hardware configuration of the communication control device 105 according to an embodiment of the present invention.

The communication control device 105 includes a CPU 201, a main memory 202, an EPROM 203, a first network interface 204, a second network interface 205, and a nonvolatile storage device 206. These components are interconnected through a bus 207 so that they can exchange information by following a predetermined procedure.

The CPU 201 executes various programs that are loaded into the main memory 202.

The main memory 202 stores various programs executed by the CPU 201 and information necessary for executing such programs. The main memory 202 according to the present embodiment stores a control information table 800 (see FIG. 3) and a quality measurement information table 900 (see FIG. 13). The control information table 800 (see FIG. 3) and the quality measurement information table 900 (see FIG. 13) may alternatively be stored in a storage medium other than the main memory 202, such as the nonvolatile storage device 206.

The EPROM 203 stores a boot program.

The nonvolatile storage device 206 stores various programs that are to be loaded into the main memory 202. The nonvolatile storage device 206 can be implemented by a flash memory or a hard disk drive (HDD).

The first network interface 204 is connected to the user premises network 106 and used to exchange information with a device connected to the user premises network 106. The first network interface 204 can be implemented by a network card or the like.

The second network interface 205 is connected to the network 101 and used to exchange information with a device connected to the network 101. The second network interface 205 can be implemented by a network card or the like.

When the communication control device 105 according to the present embodiment starts running, for instance, upon power on, the boot program stored in the EPROM 203 is executed so that various programs are loaded into the main memory 202 from the nonvolatile storage device 206. The CPU 201 executes the various programs loaded into the main memory 202 to transmit information or and receive information from the first network interface 204 or the second network interface 205.

The various programs, which are loaded into the main memory 202 from the nonvolatile storage device 206 and executed by the CPU 201, include video content delivery protocols such as Real Time Streaming Protocol (RTSP), Internet Group Management Protocol (IGMP), and Real-time Transport Protocol (RTP).

FIG. 3 is a diagram illustrating an example of the control information table 800 according to an embodiment of the present invention.

The control information table 800 stores unicast or multicast control information. The communication control device 105 can filter video data packets passing therethrough in accordance with the control information table 800 and acquire video data packets to be subjected to quality measurement.

The control information table 800 contains video receiver display device identification information 801 and video data packet identification information 802.

The video receiver display device identification information 801 includes information (A) for identifying the video receiver display devices 107, 108. The video data packet identification information 802 includes information (B) for identifying the video data packets to be subjected to delivery quality measurement.

In the example shown in FIG. 3, an entry 803 stores information about a multicast video data packet based on the IPv4 communication protocol. More specifically, a video receiver display device IP address of 192.168.1.101 is stored as the video receiver display device identification information 801, while a multicast address of 224.10.10.10 and a video delivery server 102 IP address of 133.144.1.1 are stored as the video data packet identification information 802.

Another entry 804 stores information about a unicast video data packet based on the IPv6 communication protocol. More specifically, a video receiver display device IP address of 2001::1a8:203 and a session ID of 12345, which concerns a session established between the video receiver display devices 107, 108 and the video delivery server 102, are stored as the video receiver display device identification information 801, while a video receiver display device IP address of 2001::1a8:203, a video delivery server 102 IP address of 2003::a:1, and a video receiver display device port number of 12346 are stored as the video data packet identification information 802.

Figure 4:
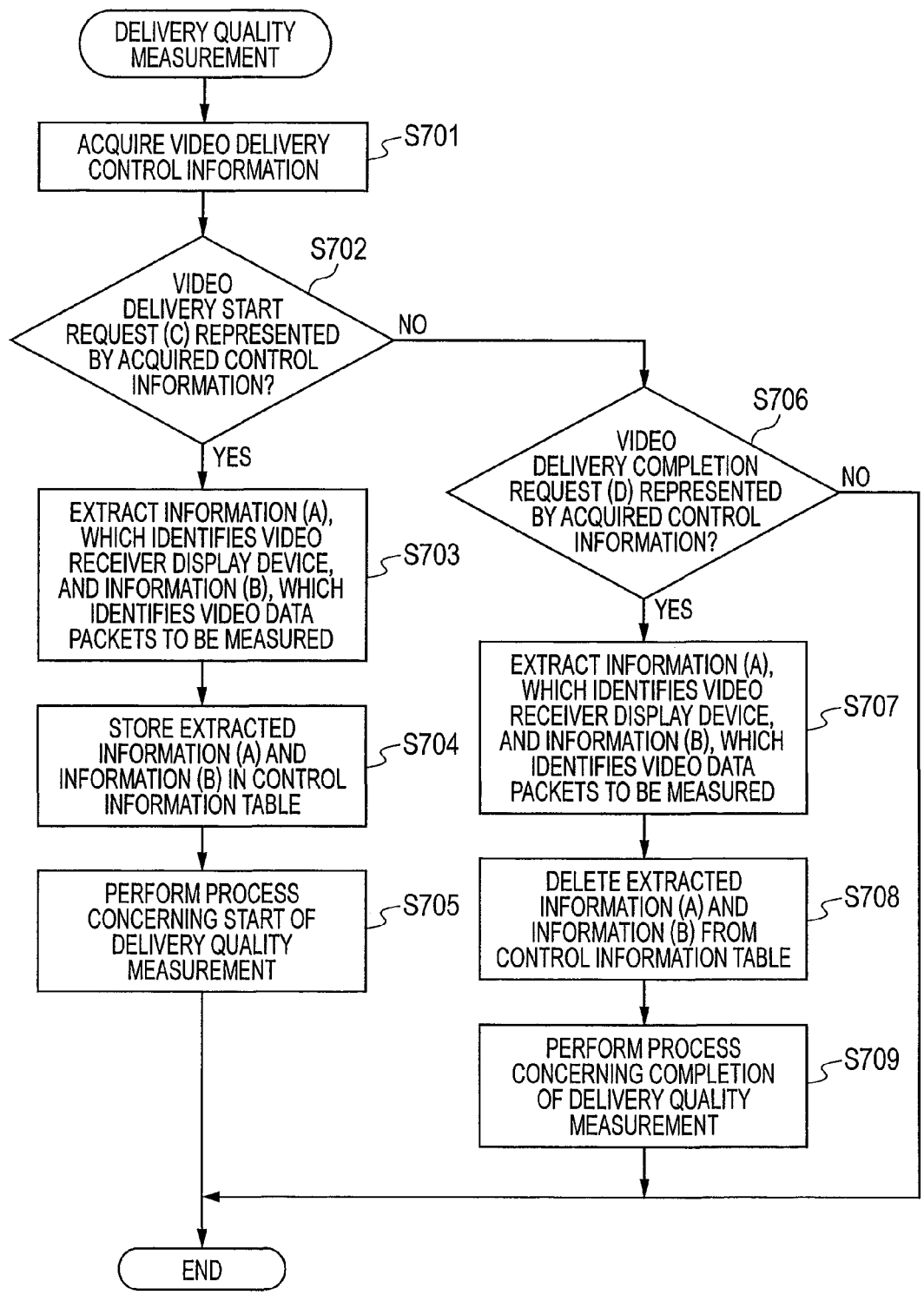
FIG. 4 is a flowchart summarizing a delivery quality measurement process performed by the communication control device according to an embodiment of the present invention.

FIG. 4 is a flowchart summarizing a delivery quality measurement process performed by the communication control device 105 according to an embodiment of the present invention.

The communication control device 105 acquires video delivery control information from the video receiver display devices 107, 108 (step 701).

The communication control device 105 judges whether the acquired control information is information (C) about a video delivery start request (step 702).

If the acquired control information is found to be the information (C) about a video delivery start request, the communication control device 105 extracts information (A), which identifies the video receiver display devices 107, 108, and information (B), which identifies the video data packets to be subjected to delivery quality measurement, from the acquired control information (step 703).

The communication control device 105 stores information (A), which identifies the video receiver display devices 107, 108, and information (B), which identifies the video data packets to be subjected to delivery quality measurement, in the control information table 800 (step 704).

The communication control device 105 performs a process concerning the start of delivery quality measurement (step 705), and then terminates its process. More specifically, the communication control device 105 calculates delivery quality information such as packet loss, packet latency, and packet jitter, and stores the result of calculation in the quality measurement information table 900.

The delivery quality measurement process performed in accordance with the present embodiment will be described in detail later with reference to FIG. 12.

If the judgment result obtained in step 702 does not indicate that the acquired control information is information (C) about a video delivery start request, the communication control device 105 judges whether the acquired control information is information (D) about a video delivery completion request (step 706).

If the judgment result obtained in step 706 does not indicate that the acquired control information is information (D) about a video delivery completion request, the communication control device 105 terminates its process.

If, on the other hand, the judgment result obtained in step 706 indicates that the acquired control information is information (D) about a video delivery completion request, the communication control device 105 extracts information (A), which identifies the video receiver display devices 107, 108, and information (B), which identifies the video data packets to be subjected to delivery quality measurement, from the acquired control information (step 706).

In accordance with extracted information (A), which identifies the video receiver display devices 107, 108, and extracted information (B), which identifies the video data packets to be subjected to delivery quality measurement, the communication control device 105 references the control information table 800, locates an entry that matches information (A) and information (B), and deletes the matching entry from the control information table 800 (step 708).

The communication control device 105 performs a process concerning the completion of delivery quality measurement (step 709), and then terminates its process.

FIG. 4 provides an overview of a basic process according to the present embodiment. Individual processing steps vary with the employed video delivery method and communication protocol. More specifically, the processing steps vary depending on whether a unicast or multicast video delivery method is employed and whether the IPv4 or IPv6 communication protocol is employed.

Processing steps performed in the above-mentioned cases will now be described.

The processing steps performed during the use of the multicast video delivery method will be described.

Figure 5:
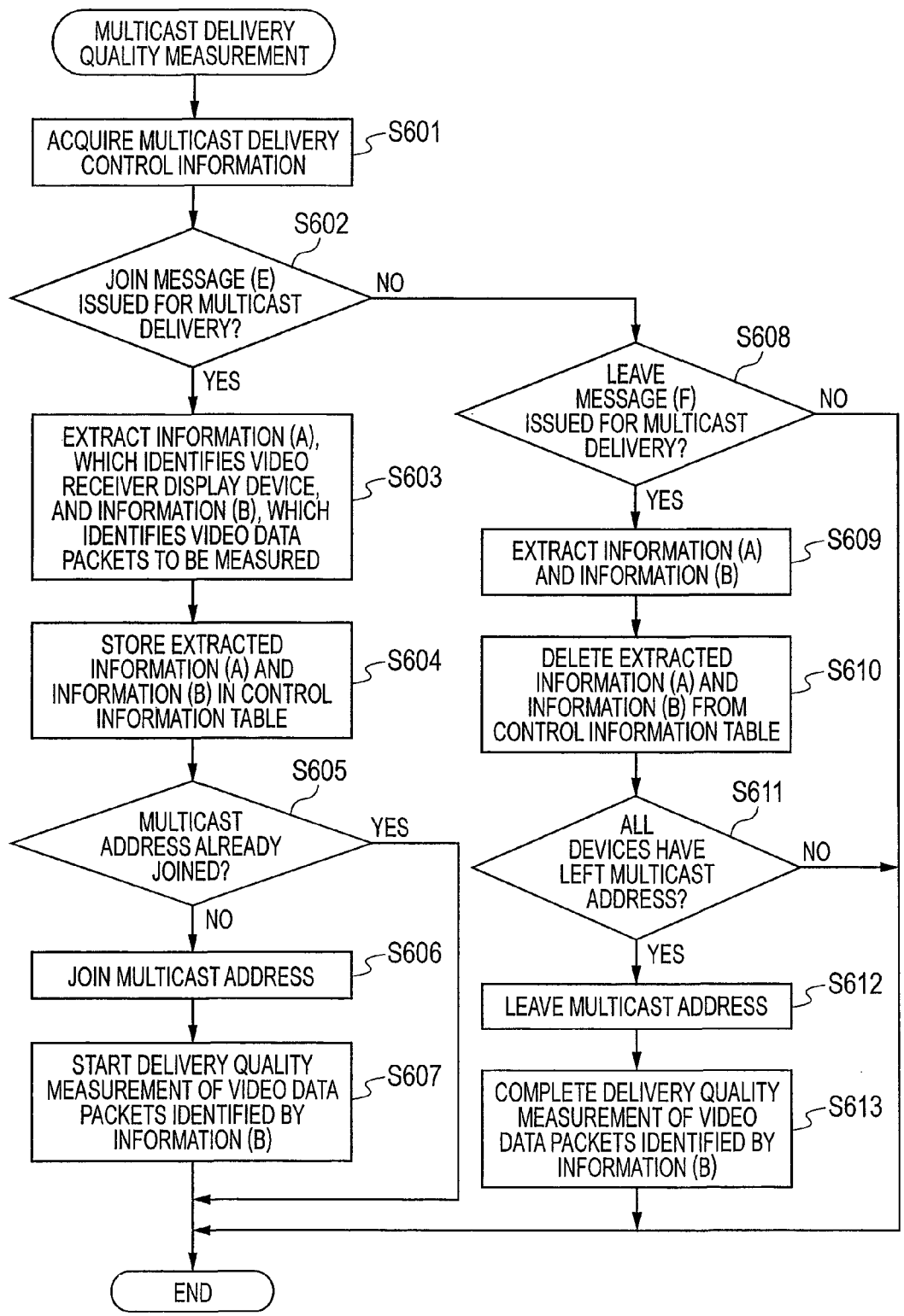
FIG. 5 is a flowchart illustrating in detail a multicast delivery quality measurement process according to an embodiment of the present invention.

FIG. 5 is a flowchart illustrating in detail a multicast delivery quality measurement process according to an embodiment of the present invention.

First of all, the communication control device 105 acquires multicast delivery control information from the video receiver display devices 107, 108 (step 601).

If the employed communication protocol is IPv4, the communication control device 105 can acquire the multicast delivery control information by filtering packets transmitted to an IPv4 multicast address.

The IPv4 multicast address is an IP address that falls within the range of 224.0.0.0 to 239.255.255.255. When, for instance, the OS (Operating System) running on the communication control device 105 is Linux (registered trademark), the OS can acquire packets transmitted to the aforementioned IP address by using an IP filter function.

If the employed communication protocol is IPv6, the communication control device 105 can acquire the multicast delivery control information by filtering packets transmitted to an IGMP report address of ff02::16.

The communication control device 105 judges whether the acquired multicast delivery control information is a JOIN message (E) for joining a multicast address (step 602).

The JOIN message for a multicast address is a message requesting that video data transmitted to the multicast address be received.

In multicast delivery, a JOIN message for a multicast address is used as a video delivery start request. In multicast delivery, therefore, the JOIN message (E) for joining a multicast address corresponds to information (C), which concerns a video delivery start request.

If the acquired multicast delivery control information is found to be a JOIN message (E) for joining a multicast address, the communication control device 105 extracts information (A), which identifies the video receiver display devices 107, 108, and information (B), which identifies the video data packets to be subjected to delivery quality measurement, from the acquired control information (step 603).

The information acquired as information (A), which identifies the video receiver display devices 107, 108, indicates the IP address of a video receiver display device 107, 108 without regard to a multicast control protocol or the version of the communication protocol.

The information acquired as information (B), which identifies the video data packets to be subjected to delivery quality measurement, will now be described.

The information acquired as information (B), which identifies the video data packets to be subjected to delivery quality measurement, varies with the version of the communication protocol and the version of the multicast control protocol, which is implemented in the video receiver display devices 107, 108 that transmit control information.

If the communication protocol is IPv4, IGMP (IPv4) is used as the multicast control protocol.

If IGMPv3 is implemented in the video receiver display devices 107, 108, the communication control device 105 can acquire a multicast address and the IP address of the video delivery server 102 as information (B), which identifies the video data packets to be subjected to delivery quality measurement.

If IGMPv2 is implemented in the video receiver display devices 107, 108, the communication control device 105 can acquire only the multicast address as information (B), which identifies the video data packets to be subjected to delivery quality measurement.

If the communication protocol is IPv6, MLD is used as the multicast control protocol.

If MLDv2 (equivalent to IGMPv3) is implemented in the video receiver display devices 107, 108, the communication control device 105 can acquire the multicast address and the IP address of the video delivery server 102 as information (B), which identifies the video data packets to be subjected to delivery quality measurement.

If MLDv1 (equivalent to IGMPv2) is implemented in the video receiver display devices 107, 108, the communication control device 105 can acquire only the multicast address as information (B), which identifies the video data packets to be subjected to delivery quality measurement.

In accordance with the information acquired in step 603, the communication control device 105 can acquire video data packets of video content to be measured. When a video quality measurement process is to be performed, however, each of the video receiver display devices 107, 108 needs to identify the video data packets of the video content to be measured. More specifically, for multicast delivery, the multicast address, the IP address of the video delivery server 102, and the ports of the video receiver display devices 107, 108 are necessary.

Therefore, when a delivery quality measurement process is to be performed in a situation where a certain item of information cannot be acquired in step 603, video data packets need to be sorted by processing target. When, for instance, multicast delivery is to be performed while the video receiver display devices 107, 108 use MLDv2, the delivery quality measurement process is performed by sorting the video data packets into the ports of the video receiver display devices 107, 108, which are not included in information (B) for identifying the video data packets to be subjected to delivery quality measurement.

A method for sorting the video data packets for delivery quality measurement will be described later with reference to FIG. 14.

Returning to FIG. 5, the rest of the delivery quality measurement process will be described.

The communication control device 105 stores information (A) and information (B), which are both extracted from the control information, in the control information table 800 (step 604). Information (A) identifies the video receiver display devices 107, 108, whereas information (B) identifies the video data packets to be subjected to delivery quality measurement.

The communication control device 105 references the control information table 800 and judges whether the multicast address to which the JOIN message has been transmitted is already joined (step 605). In other words, the communication control device 105 judges whether the other video receiver display device has already joined the multicast address that has wished to join.

The above judgment step (step 605) is performed by checking whether the video data packet identification information 802 in the control information table 800 includes the same entry as information (B), which is acquired in step 602 and used to identify the video data packets to be subjected to delivery quality measurement.

If the judgment result obtained in step 605 indicates that the multicast address has not joined although it has wished to join, the communication control device 105 performs a process for joining the multicast address that has wished to receive (step 606).

The communication control device 105 references the control information table 800, filters data packets to be measured, and starts measuring the delivery quality of data packets that are acquired as a result of filtering and subjected to measurement (step 607), and then terminates its process.

If, on the other hand, the judgment result obtained in step 605 indicates that the multicast address, which has wished to join, has already joined, the communication control device 105 terminates its process.

When, for instance, the video receiver display device 108 attempts to join a multicast address that the video receiver display device 107 has already joined, delivery quality measurement has already started as a device connected to the user premises network 106 has already joined the multicast address.

It should be noted that a process performed in steps 605 to 607 corresponds to a process performed in step 705, which is shown in FIG. 4.

If the judgment result obtained in step 602 does not indicate that the acquired multicast delivery control information is a JOIN message (E) for joining a multicast address, the communication control device 105 judges whether the acquired multicast delivery control information is a LEAVE message (F) for leaving a multicast address (step 608).

The LEAVE message for leaving a multicast address is a message that indicates the end of reception of video data transmitted to the multicast address.

If the judgment result obtained in step 608 does not indicate that the acquired multicast delivery control information is a LEAVE message (F) for leaving a multicast address, the communication control device 105 terminates its process.

If, on the other hand, the judgment result obtained in step 608 indicates that the acquired multicast delivery control information is a LEAVE message (F) for leaving a multicast address, the communication control device 105 extracts information (A), which identifies the video receiver display devices 107, 108, and information (B), which identifies the video data packets to be subjected to delivery quality measurement, from the acquired control information (step 609). The method of acquiring information (A) and information (B) is the same as used in step 603.

In multicast delivery, the LEAVE message (F) for a multicast address is used as a video delivery completion request. In multicast delivery, therefore, the LEAVE message (F) for a multicast address corresponds to information (D) about a video delivery completion request.

In accordance with the extracted items of information, namely, information (A), which identifies the video receiver display devices 107, 108, and information (B), which identifies the video data packets to be subjected to delivery quality measurement, the communication control device 105 references the control information table 800, locates an entry that matches information (A) and information (B), and deletes the matching entry from the control information table 800 (step 610).

The communication control device 105 judges whether all devices have left the multicast address for which the LEAVE message has been transmitted (step 611).

The above judgment step (step 611) is performed by checking whether the video data packet identification information 802 in the control information table 800 includes the same entry as information (B), which is acquired in step 602 and used to identify the video data packets to be subjected to delivery quality measurement.

If the video data packet identification information 802 includes at least one entry that is the same as information (B), which is acquired in step 602 and used to identify the video data packets to be subjected to delivery quality measurement, it is judged that all devices have not left.

If it is judged that all devices have left the multicast address for which the LEAVE message has been transmitted, the communication control device 105 performs a process for leaving the multicast address (step 612).

The communication control device 105 completes the delivery quality measurement of the target video data packets (step 613), and then terminates its process.

When it is judged that all devices have not left the multicast address for which the LEAVE message has been transmitted, the communication control device 105 terminates its process.

If, for instance, the communication control device 105 receives a LEAVE message from the video receiver display device 107 in a situation where the video receiver display devices 107, 108 have joined the same multicast address, the video receiver display device 108 has joined the multicast address and is receiving video data packets transmitted from the video delivery server 102. Therefore, the delivery quality of video data packets transmitted from the multicast address is continuously measured.

It should be noted that a process performed in steps 611 to 613 corresponds to step 709, which is shown in FIG. 4.

Figure 6:
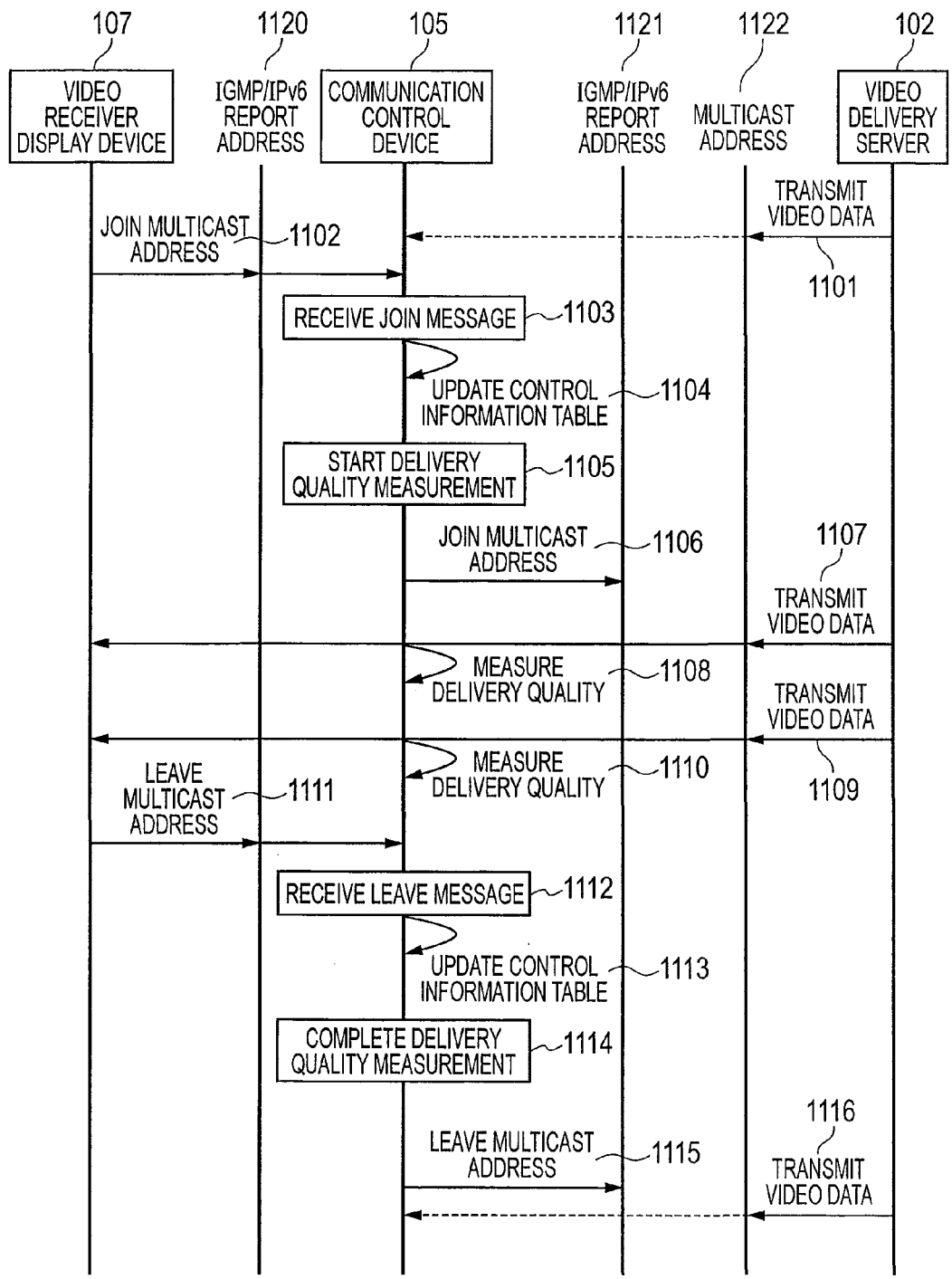
FIG. 6 is a sequence diagram illustrating processing steps for multicast delivery quality measurement according to an embodiment of the present invention.

FIG. 6 is a sequence diagram illustrating processing steps for multicast delivery quality measurement according to an embodiment of the present invention. This sequence diagram assumes that the communication protocol is IPv6 while the multicast control protocol is MLDv2.

The video delivery server 102 transmits video data packets to a multicast address 1122 (step 1101).

At this point, however, the video receiver display device 107 has not joined the multicast address 1122. Therefore, no video data packets are transmitted to the communication control device 105.

In order to acquire video data packets, the video receiver display device 107 transmits a JOIN message for joining the multicast address 1122 (step 1102). More specifically, the video receiver display device 107 transmits a JOIN message for the multicast address 1122 to an IGMP/IPv6 report address 1120 (ff02::16 in the present embodiment) of a common subnet (user premises network 106 in the present embodiment) to which the video receiver display device 107 belongs.

The communication control device 105 monitors packets transmitted to the IGMP/IPv6 report address 1120 of the user premises network 106.

The communication control device 105 receives the JOIN message addressed to the IGMP/IPv6 report address 1120 (step 1103), analyzes the received JOIN message, extracts the IP address of the message sender (video receiver display device 107), the IP address of the video delivery server 102, and the multicast address 1122, and updates the control information table 800 in accordance with the extracted information (step 1104). Further, the communication control device 105 starts measuring the delivery quality with the control information table 800 (step 1105).

More specifically, the communication control device 105 stores the IP address of the message sender (video receiver display device 107) as the video receiver display device identification information 801, and stores the IP address of the video delivery server 102 and the multicast address 1122 as the video data packet identification information 802. Thus, the communication control device 105 can acquire video data packets to be subjected to delivery quality measurement by filtering them. Further, the communication control device 105 can start measuring the delivery quality after receipt of the JOIN message for the multicast address 1122.

Upon receipt of the JOIN message for the multicast address 1122, the communication control device 105 performs a multicast routing process by exercising a common multicast router function. The multicast routing process is performed so that multicast packets received from the network 101 by the communication control device 105 are forwarded to the user premises network 106.

Next, the communication control device 105 transmits a JOIN message for the multicast address 1122 to the network 101 (step 1106). The JOIN message for the multicast address 1122 is transmitted to an IGMP/IPv6 report address 1121. The IGMP/IPv6 report address 1121 is the same as the IGMP/IPv6 report address 1120.

In the present embodiment, it is assumed that the network 101 is formed by a single subnet. In an actual commercial network system, the network 101 includes many backbone routers (not shown).

A backbone router (not shown) existing upstream of the communication control device 105 receives the JOIN message that is transmitted from the communication control device 105 to the multicast address 1122. Upon receipt of the JOIN message, the backbone router (not shown) performs a multicast routing process by exercising a common multicast router function, as is the case with the communication control device 105, and transmits a JOIN message to an upstream network.

When the above-described process is performed, the video data packets transmitted from the video delivery server 102 are passed through various routers (not shown) and the communication control device 105 and transmitted to the video receiver display device 107 connected to the user premises network 106 (steps 1107 and 1109).

Subsequently, when the same process as described earlier is performed, the video data packets are transmitted to the user premises network 106.

The communication control device 105 acquires target video data packets, which are to be measured, by filtering video data packets, which pass through the communication control device 105, in accordance with the control information table 800, and measures the delivery quality of the acquired video data packets (steps 1108, 1110).

Next, the video receiver display device 107 transmits a LEAVE message for leaving the multicast address 1122 to the IGMP/IPv6 report address 1120 (ff02::16 in the present embodiment) of the common subnet (user premises network 106 in the present embodiment) to which the video receiver display device 107 belongs (step 1111).

The communication control device 105 receives the LEAVE message for leaving the multicast address 1122 (step 1112), extracts the IP address of the message sender (video receiver display device 107), the IP address of the video delivery server 102, and the multicast address 1122 from the LEAVE message, updates the control information table 800 in accordance with the extracted information (step 1113), and completes the measurement of delivery quality (step 1114).

More specifically, the communication control device 105 locates an entry that matches the extracted information, and deletes the matching entry from the control information table 800. This causes the communication control device 105 to terminate its video data packet filtering operation for the deleted entry.

The communication control device 105 transmits the LEAVE message for leaving the multicast address 1122 to the IGMP/IPv6 report address 1121 (step 1115). The LEAVE message for leaving the multicast address 1122 sequentially propagates to backbone routers (not shown) existing upstream of the communication control device 105. This causes the video receiver display device 107 to leave the multicast address 1122.

Subsequently, video data packets transmitted from the video delivery server 102 will not be received (step 1116).

FIGS. 7A and 7B are sequence diagrams illustrating processing steps for multicast delivery quality measurement according to an embodiment of the present invention. These sequence diagrams assume that multicast video delivery is performed when the communication protocol is IPv6 and the multicast control protocol is MLDv2.

The sequence diagrams of FIGS. 7A and 7B differ from the sequence diagram of FIG. 6 in that two video receiver display devices 107, 108 are included. Processing steps identical with those in FIG. 6 will not be redundantly described. The subsequent description mainly deals with differences from the processing steps depicted in FIG. 6.

The video delivery server 102 transmits video data packets addressed to a multicast address 1122 (step 1201).

At this point, however, the video receiver display devices 107, 108 have not joined the multicast address 1122. Therefore, no video data packets are transmitted to the communication control device 105.

In order to acquire video data packets, the video receiver display device 107 transmits a JOIN message for joining the multicast address 1122 (step 1202). More specifically, the video receiver display device 107 transmits a JOIN message for the multicast address 1122 to an IGMP/IPv6 report address 1120 of the common subnet (user premises network 106 in the present embodiment) to which the video receiver display device 107 belongs.

The communication control device 105 receives the JOIN message for the multicast address 1122 (step 1203), updates the control information table 800 by performing the same process as in step 1104, which is shown in FIG. 6 (step 1204), and starts measuring the delivery quality (step 1205).

More specifically, the communication control device 105 extracts the IP address of the message sender (video receiver display device 107), the IP address of the video delivery server 102, and the multicast address 1122 from the JOIN message for the multicast address 1122, stores the IP address of the message sender (video receiver display device 107) as the video receiver display device identification information 801, and stores the IP address of the video delivery server 102 and the multicast address 1122 as the video data packet identification information 802.

The communication control device 105 transmits a JOIN message for the multicast address 1122 (step 1206).

This blocks the video receiver display device 107 from receiving video data packets (step 1207). At this point, the video receiver display device 108 does not receive the video data packets because it has not joined the multicast address 1122.

The communication control device 105 filters video data packets passing through the communication control device 105 in accordance with the control information table 800 to acquire the video data packets to be measured, and then measures the delivery quality of the acquired video data packets (step 1208).

Next, the video receiver display device 108 transmits a JOIN message for joining the same multicast address 1122 in order to receive the same video data packets as those received by the video receiver display device 107 from the video delivery server 102 (step 1209).

The communication control device 105 receives the JOIN message for the multicast address 1122 (step 1210), updates the control information table 800 by performing the same process as in step 1104, which is shown in FIG. 6 (step 1211), and starts measuring the delivery quality (step 1212).

More specifically, the communication control device 105 extracts the IP address of the message sender (video receiver display device 108), the IP address of the video delivery server 102, and the multicast address 1122 from the JOIN message for the multicast address 1122, stores the IP address of the message sender (video receiver display device 108) as the video receiver display device identification information 801, and stores the IP address of the video delivery server 102 and the multicast address 1122 as the video data packet identification information 802.

When steps 1202 to 1210 are completed, the video delivery server 102 transmits video data packets to the video receiver display devices 107, 108 (step 1213) so that the delivery quality of the video data packets is measured (step 1214).

As joining the multicast address 1122 is already completed in step 1206, the communication control device 105 does not transmit a JOIN message for the multicast address 1122 to the IGMP/IPv6 report address 1121.

Next, the video receiver display device 108 transmits a LEAVE message for leaving the multicast address 1122 (step 1215).

The communication control device 105 receives the LEAVE message for leaving the multicast address 1122 (step 1216), and updates the control information table 800 by performing the same process as in step 1113, which is shown in FIG. 6 (step 1217).

More specifically, the communication control device 105 extracts the IP address of the message sender (video receiver display device 108), the IP address of the video delivery server 102, and the multicast address 1122 from the LEAVE message for leaving the multicast address 1122, locates an entry that matches the extracted information, and deletes the matching entry from the control information table 800.

When the control information table 800 is updated as described above, no video packets are transmitted to the video receiver display device 108. Further, the communication control device 105 can terminate its video data packet filtering operation for the entry deleted from the control information table 800.

After the control information table 800 is updated, video data packets from the video delivery server 102 are transmitted to only the video receiver display device 107 (step 1218) so that the delivery quality of the video data packets is continuously measured (step 1219).

The reason is that video data packets matching an entry from which the IP address of the video delivery server 102 and the multicast address 1122 are deleted are received as the video data packet identification information 802. In other words, the delivery quality is continuously measured in a situation where at least one of the devices connected to the user premises network 106, that is, the video receiver display device 107 in the present example, has joined the multicast address 1122.

Next, the video receiver display device 107 transmits a LEAVE message for leaving the multicast address 1122 (step 1220).

The communication control device 105 receives the LEAVE message for leaving the multicast address 1122 (step 1121), and updates the control information table 800 by performing the same process as in step 1113, which is shown in FIG. 6 (step 1222).

More specifically, the communication control device 105 extracts the IP address of the message sender (video receiver display device 107), the IP address of the video delivery server 102, and the multicast address 1122 from the LEAVE message for leaving the multicast address 1122, locates an entry that matches the extracted information, and deletes the matching entry from the control information table 800.

When the above process is completed, all devices connected to the user premises network 106 have left the multicast address 1122. Therefore, the delivery quality measurement is completed (step 1223).

The communication control device 105 transmits a LEAVE message for leaving the multicast address 1122 to the IGMP/IPv6 report address 1121 (step 1224). The LEAVE message for leaving the multicast address sequentially propagates to backbone routers (not shown) existing upstream of the communication control device 105. This causes the video receiver display device 107 to leave the multicast address 1122.

Subsequently, video data packets transmitted from the video delivery server 102 will not be received (step 1225).

Figure 8:
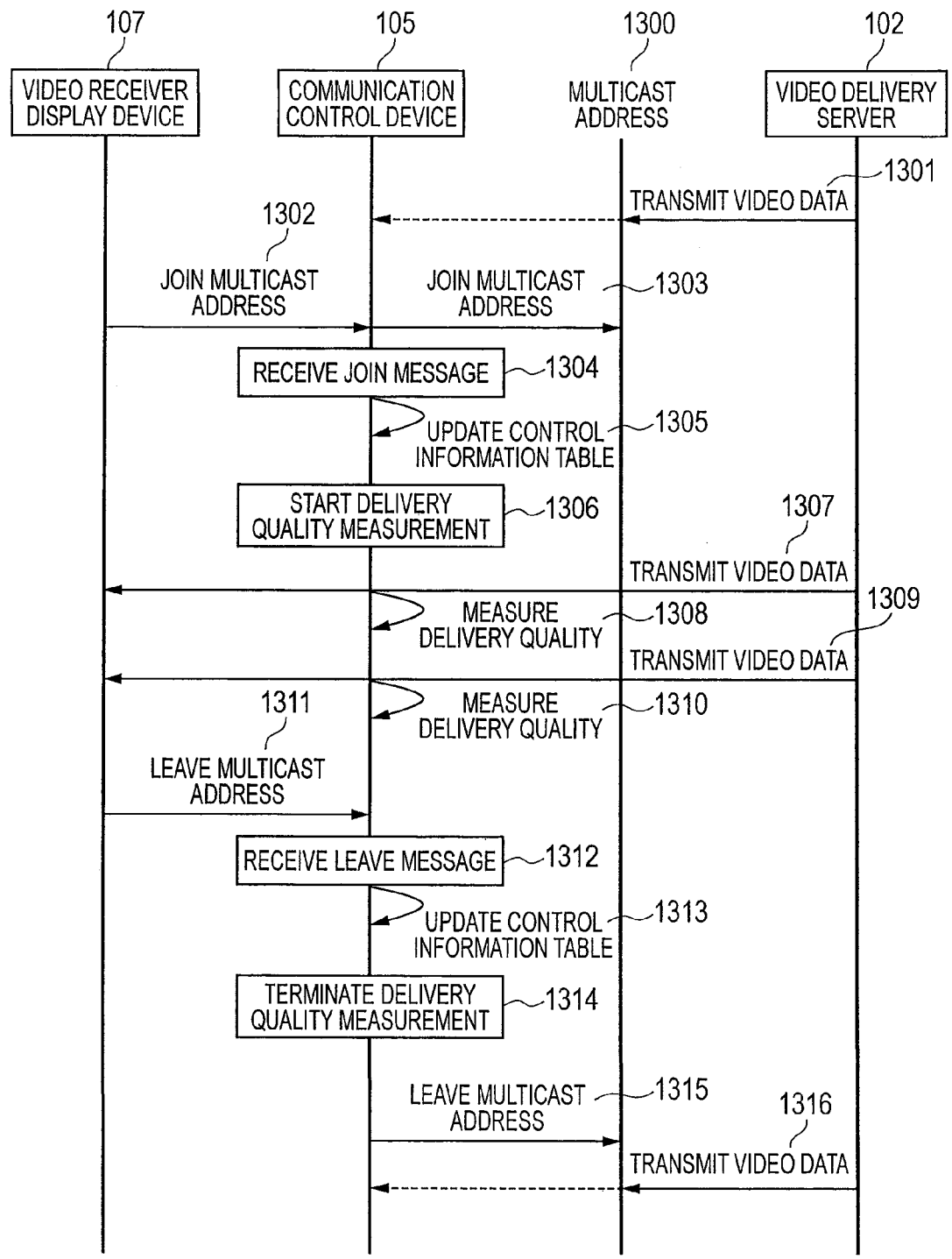
FIG. 8 is a sequence diagram illustrating processing steps for multicast delivery quality measurement according to an embodiment of the present invention.

FIG. 8 is a sequence diagram illustrating processing steps for multicast delivery quality measurement according to an embodiment of the present invention. This sequence diagram assumes that multicast video delivery is performed when the communication protocol is IPv4 and the multicast control protocol is IGMPv3.

The video delivery server 102 transmits video data packets addressed to a multicast address 1300 (step 1301).

At this point, however, the video receiver display device 107 has not joined the multicast address 1300. Therefore, no video data packets are transmitted to the communication control device 105.

In order to acquire video data packets, the video receiver display device 107 transmits a JOIN message for the multicast address 1300 to the communication control device 105 (step 1302). Further, the communication control device 105 transmits a JOIN message for the multicast address 1300 to the multicast address 1300 (step 1303).

When the communication protocol is IPv6, the IP address of a control information (MLD) recipient is the IGMP/IPv6 report address 1120, 1121. However, when the communication protocol is IPv4, the IP address of a control information (IGMP) recipient is the multicast address 1300 itself.

The communication control device 105 receives the JOIN message for the multicast address 1300 (step 1304), extracts the IP address of the message sender (video receiver display device 107), the IP address of the video delivery server 102, and the multicast address 1300, updates the control information table 800 in accordance with the extracted information (step 1305), and starts measuring the delivery quality (step 1306). This process is the same as depicted in FIG. 6.

When the above process is completed, the video data packets transmitted from the video delivery server 102 pass through the backbone routers (not shown) and the communication control device 105 and are forwarded to the video receiver display device 107 connected to the user premises network 106 (steps 1307 and 1309).

The communication control device 105 filters video data packets passing through the communication control device 105 in accordance with the control information table 800 to acquire the video data packets to be measured, and then measures the delivery quality of the acquired video data packets (steps 1308 and 1310).

Next, the video receiver display device 107 transmits a LEAVE message for leaving the multicast address 1300 to the multicast address 1300 (step 1311).

The communication control device 105 receives the LEAVE message for leaving the multicast address 1300 (step 1312), extracts the IP address of the message sender (video receiver display device 107), the IP address of the video delivery server 102, and the multicast address 1300 from the LEAVE message for leaving the multicast address 1300, updates the control information table 800 in accordance with the extracted information (step 1313), and completes the measurement of delivery quality (step 1314).

More specifically, the communication control device 105 locates an entry that matches the extracted information, and then deletes the matching entry from the control information table 800. This process is the same as depicted in FIG. 6.

The communication control device 105 transmits a LEAVE message for leaving the multicast address 1300 to the multicast address 1300 (step 1315). The LEAVE message for leaving the multicast address 1300 sequentially propagates to backbone routers (not shown) existing upstream of the communication control device 105. This causes the video receiver display device 107 to leave the multicast address 1300.

Subsequently, video data packets transmitted from the video delivery server 102 will not be received (step 1316).

The processing steps performed during the use of the unicast video delivery method will now be described.

Figure 9:
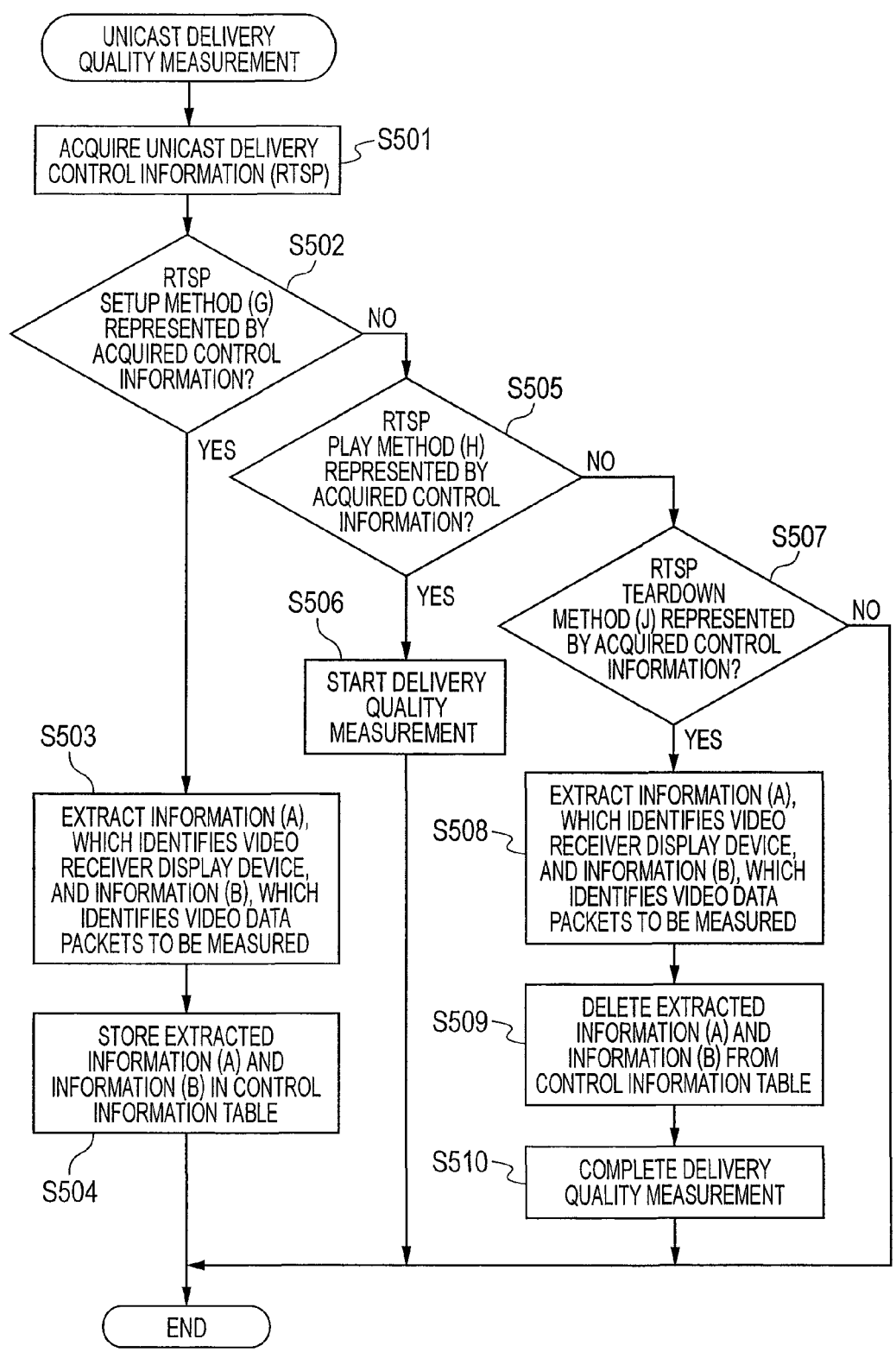
FIG. 9 is a flowchart illustrating in detail a unicast delivery quality measurement process according to an embodiment of the present invention.

FIG. 9 is a flowchart illustrating in detail a unicast delivery quality measurement process according to an embodiment of the present invention.

First of all, the communication control device 105 acquires unicast delivery control information from the video receiver display devices 107, 108 (step 501).

When the unicast video delivery method is employed, the control information is transmitted by using Real Time Streaming Protocol (RTSP).

The communication control device 105 acquires RTSP information by filtering packets addressed to a port for RTSP (port No. 554). This process remains unchanged no matter whether the communication protocol is IPv4 or IPv6.

When the unicast video delivery method is employed, the process performed in step 702, which is shown in FIG. 4, is divided into two processes, namely, a process for receiving a SETUP method (G) of RTSP and a process for receiving a PLAY method (H) of RTSP. In other words, two items of information, namely, the RTSP SETUP method (G) and the RTSP PLAY method (H), correspond to information (C), which concerns a video delivery start request.

The RTSP SETUP method (G) contains information necessary for video delivery. More specifically, the RTSP SETUP method (G) contains information about the IP address of a video sender (video delivery server 102), the IP address of a video recipient (video receiver display device 107), the port of the video sender (video delivery server 102), the port of a video delivery destination (such as a backbone router) to which the video sender (video delivery server 102) transmits video addressed to a multicast address, the port of the video recipient (video receiver display device 107), and the identifier (session ID) of a session established between the video sender (video delivery serer 102) and the video recipient (video receiver display device 107).

The RTSP PLAY method (H) contains information that prompts for the start of video delivery.

The communication control device 105 judges whether the acquired control information is the RTSP SETUP method (G) (step 502).

The communication control device 105 references a packet header showing the acquired control information to judge whether the acquired control information is the RTSP SETUP method (G).

If the judgment result obtained in step 502 indicates that the acquired control information is the RTSP SETUP method (G), the communication control device 105 extracts information (A), which identifies the video receiver display devices 107, 108, and information (B), which identifies the video data packets to be subjected to delivery quality measurement, from the acquired control information (step 503).

The communication control device 105 stores the information extracted from the control information, namely, information (A) for identifying the video receiver display devices 107, 108 and information (B) for identifying the video data packets to be subjected to delivery quality measurement, in the control information table 800 (step 504), and terminates its process.

If, on the other hand, the judgment result obtained in step 502 does not indicate that the acquired control information is the RTSP SETUP method (G), the communication control device 105 judges whether the acquired control information is the RTSP PLAY method (H) (step 505). This judgment is formed by using the same method as in step 502.

If the judgment result obtained in step 505 indicates that the acquired control information is the RTSP PLAY method (H), the communication control device 105 references the control information table 800, starts measuring the delivery quality of the video data packets to be subjected to delivery quality measurement (step 506), and terminates its process.

If, on the other hand, the judgment result obtained in step 505 does not indicate that the acquired control information is the RTSP PLAY method (H), the communication control device 105 judges whether the acquired control information is TEARDOWN (J) of RTSP (step 507).

The RTSP TEARDOWN (J) contains the IP addresses of the video receiver display devices 107, 108, a session ID, and information that prompts for the stop of video delivery. The RTSP TEARDOWN (J) corresponds to information (D), which concerns a video delivery completion request.

If the judgment result obtained in step 507 does not indicate that the acquired control information is the RTSP TEARDOWN (J), the communication control device 105 terminates its process.

If, on the other hand, the judgment result obtained in step 507 indicates that the acquired control information is the RTSP TEARDOWN (J), the communication control device 105 extracts information (A), which identifies the video receiver display devices 107, 108, and information (B), which identifies the video data packets to be subjected to delivery quality measurement, from the acquired control information (step 508). Information (B) that identifies the video data packets to be subjected to delivery quality measurement and is not contained in the RTSP TEARDOWN (J) can be acquired by referencing, for instance, a session ID/session status management table (not shown).

In accordance with the extracted information, namely, information (A), which identifies the video receiver display devices 107, 108, and information (B), which identifies the video data packets to be subjected to delivery quality measurement, the communication control device 105 references the control information table 800, locates an entry that matches information (A) and information (B), deletes the matching entry from the control information table 800 (step 509), completes the measurement of delivery quality (step 510), and terminates its process.

When unicast delivery is to be performed by using IPv4 as the communication protocol in a common configuration of the user premises network 106 where the video receiver display devices 107, 108 have IPv4 private addresses only, the video delivery server 102 cannot directly transmit video data packets to the video receiver display devices 107, 108 under normal conditions. This is a so-called NAT traversal problem, and there are some known solutions to this problem. In the present embodiment, it is assumed that a certain method, the details of which will not be described here, is employed to set up port forwarding from a port of the communication control device 105 having a global IP address to the associated ports of the video receiver display devices 107, 108.

FIG. 10 is a diagram illustrating an example of a port forwarding information table 300 according to an embodiment of the present invention.

When IPv4-based unicast delivery is to be performed with port forwarding set up, the port forwarding table 300 shown, for instance, in FIG. 10 is used. The port forwarding information table 300 defines information about port forwarding. The port forwarding information table 300 is stored, for instance, in the main memory 202.

The port forwarding information table 300 contains an item number 301, a communication control device port 302, a video receiver display device IP address 303, and a video receiver display device port 304.

The item number 301 is an identifier that uniquely defines information stored in the port forwarding information table 300.

The communication control device port 302 is a port number that is used when the communication control device 105 transmits video data packets.

The video receiver display device IP address 303 is the IP address of a video receiver display device 107, 108 to which video data packets are to be transmitted.

The video receiver display device port 304 is a port number that is used when a video receiver display device 107, 108 receives video data packets.

The information contained in the port forwarding information table 300 shown in FIG. 10 is stored as the video data packet identification information 802 in the control information table 800.

Figure 11:
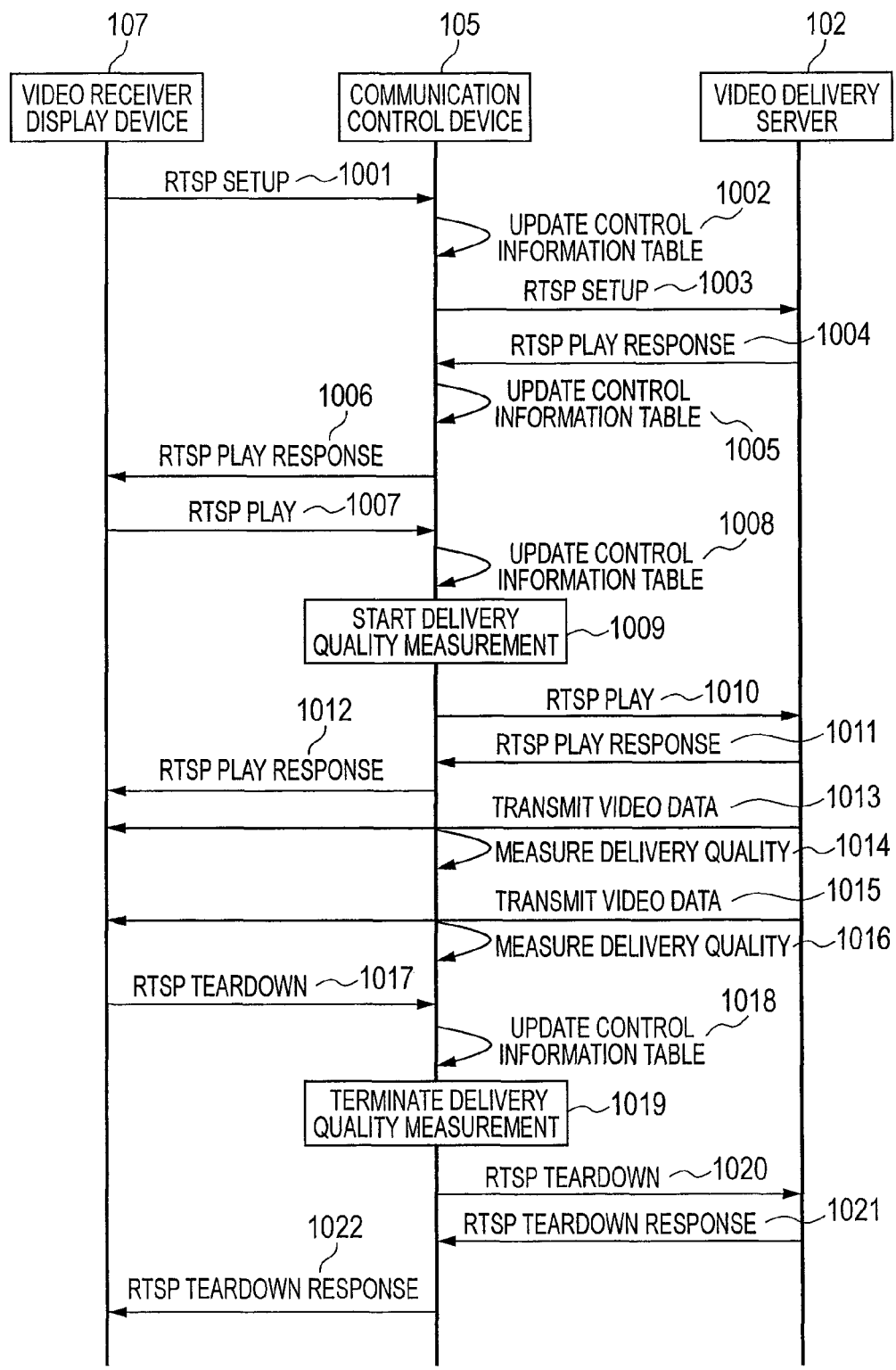
FIG. 11 is a sequence diagram illustrating in detail a unicast delivery quality measurement process according to an embodiment of the present invention.

FIG. 11 is a sequence diagram illustrating in detail a unicast delivery quality measurement process according to an embodiment of the present invention.

Processing steps described below do not vary with the Communication protocol (IPv4/IPv6). For the sake of simplicity, however, the embodiment of the present invention will be described on the assumption that the video receiver display device 107 has a global IPv4 address or an IPv6 address.

The video receiver display device 107 transmits an RTSP SETUP message to the video delivery server 102 (step 1001).

The communication control device 105 operates so that unicast video delivery control information (RTSP message) transmitted to the video delivery server 102 from a device (e.g., video receiver display device 107) connected to the user premises network 106 is terminated (disintermediated) in the communication control device 105.

The termination (disintermediation) of unicast video delivery control information can be performed when packets addressed to a specific port are acquired by filtering. As an RTSP message is usually transmitted to port No. 554, the communication control device 105 can terminate (disintermediate) the RTSP message, which is transmitted from the video receiver display device 107, by filtering messages addressed to port No. 554.

The communication control device 105 disintermediates the RTSP message, which is transmitted from the video receiver display device 107 to the video delivery server 102, extracts necessary information from the RTSP message, and updates the control information table 800 in accordance with the extracted information (step 1002).

More specifically, if an RTSP session ID is not included in the RTSP message, the communication control device 105 stores the IP address of the RTSP message sender (video receiver display device 107) as the video receiver display device identification information 801 and stores the IP address of the RTSP message sender (video receiver display device 107) and the IP address of the video delivery server 102 as the video data packet identification information 802.

Next, the communication control device 105 transmits an RTSP SETUP message to the video delivery server 102 with the communication control device 105 defined as, a message sender (step 1003).

The communication control device 105 then receives an RTSP PLAY response to the RTSP SETUP message from the video delivery server 102 (step 1004). Upon receipt of the RTSP PLAY response, the communication control device 105 updates the control information table 800 in accordance with information included in the RTSP PLAY response (step 1005).

More specifically, the communication control device 105 stores an RTSP session ID included in the RTSP PLAY response as the video receiver display device identification information 801 and stores the information about a port of the video recipient (video receiver display device 107) as the video data packet identification information 802.

Next, the communication control device 105 transmits the information received from the video delivery server 102 to the video receiver display device 107 as a response (RTSP PLAY response) to the RTSP SETUP message (step 1006).

Next, the video receiver display device 107 transmits an RTSP PLAY message (step 1007).

The communication control device 105 disintermediates the RTSP PLAY message, extracts necessary information from the RTSP PLAY message, and updates the control information table 800 in accordance with the extracted information (step 1008). This process is the same as depicted in FIG. 6.

The communication control device 105 acquires from the control information table 800 an entry matching the IP address of the RTSP PLAY message sender (video receiver display device 107) and the RTSP session ID, which are extracted from the RTSP PLAY message, and then filters video data packets corresponding to the acquired entry to start measuring the delivery quality of the video data packets (step 1009).

The communication control device 105 transmits an RTSP PLAY message to the video delivery server 102 (step 1010).

The communication control device 105 receives an RTSP PLAY response from the video delivery server 102 (step 1011), and then transmits the RTSP PLAY response to the video receiver display device 107 (step 1012).

When the above process is completed, the preparation for video data packet transmission is completed so that the video delivery server 102 starts transmitting the video data packets to the video receiver display device 107 (steps 1013 and 1015).

The communication control device 105 acquires video data packets by filtering the video data packets transmitted from the video delivery server 102 to the video receiver display device 107, and then measures the delivery quality of the acquired video data packets (steps 1014 and 1016).

When the video receiver display device 107 transmits an RTSP TEARDOWN message (step 1017), the communication control device 105 deletes the associated information from the control information table 800 (step 1018), and completes the measurement of delivery quality (step 1019). The process for deleting the associated information from the control information table 800 is the same as depicted in FIG. 6.

Further, the communication control device 105 transmits an RTSP TEARDOWN message to the video delivery server 102 (step 1020).

The communication control device 105 receives an RTSP TEARDOWN response from the video delivery server 102 as a response to the RTSP TEARDOWN message (step 1021), and then transmits the RTSP TEARDOWN response to the video receiver display device 107 (step 1022).

The delivery quality measurement process according to the present embodiment will now be described in detail.

In order to measure the delivery quality of video delivery based on RTP, the communication control device 105 analyzes RTP packets received by the video receiver display devices 107, 108, acquires delivery quality information such as packet loss, packet latency, and packet jitter, and reports the result of delivery quality measurement, for instance, to the video delivery server 102 by using RTCP RR (RTP Control Protocol Receiver Report).

The method of analyzing RTP packets is described in detail below.

When a packet loss measurement is to be made, sequence numbers indicated in the header portions of RTP packets are checked for continuity. If there is any discontinuity between the sequence numbers, it is regarded as a packet loss (a packet that has failed to reach a video receiver display device 107, 108). If, for instance, the sequence numbers of packets received after the receipt of the first RTP packet whose sequence number is 12345 are 12346, 12348, and 12351, it means that packets having the sequence numbers 12347, 12349, and 12350 have not reached a video receiver display device 107, 108.

The packet latency can be calculated from the difference between a timestamp in the header portion of an RTP packet and the time at which the RTP packet is received by a video receiver display device 107, 108.

The packet jitter can be calculated from the absolute value of the difference between an average packet latency value of all RTP packets and the packet latency value of a specific packet.

Processing steps for delivery quality measurement according to the present embodiment will now be described in detail.

Figure 12:
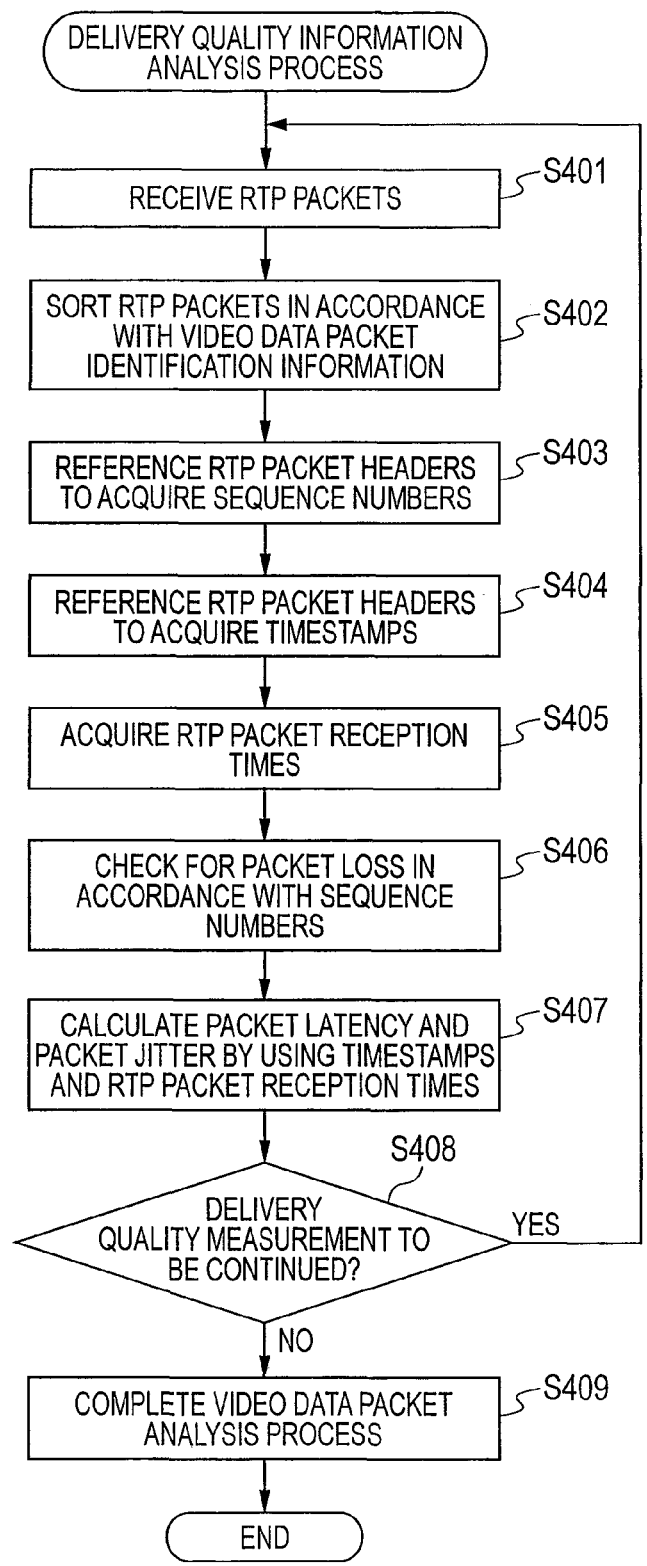
FIG. 12 is a flowchart illustrating in detail a delivery quality measurement process performed by the communication control device according to an embodiment of the present invention.

FIG. 12 is a flowchart illustrating in detail a delivery quality measurement process performed by the communication control device 105 according to an embodiment of the present invention.

FIG. 12 depicts the details of the process concerning the start of delivery quality measurement in step 705, which is shown in FIG. 4.

The communication control device 105 receives RTP packets (video data packets) (step 401).

The communication control device 105 references the control information table 800, and sorts the received RTP packets in accordance with information that identifies video data packets of specific video content (step 402).

When unicast delivery is performed, the information identifying the video data packets of specific video content includes the IP address of the video delivery server 102, the port number of a video delivery destination (video receiver display device 107, 108), and a session ID. When multicast delivery is performed, on the other hand, the information identifying the video data packets of specific video content includes a multicast address, the IP address of the video delivery server 102, and the port number of the video delivery destination (video receiver display device 107, 108).

As regards the aforementioned items of information that are not contained in the control information table 800, the video data packets are sorted to measure the delivery quality of each sorted video data packet. In other words, the video data packets acquired upon filtering are further sorted by processing target to measure the delivery quality. A video data packet sorting process will be described in detail later with reference to FIG. 14.

When, for instance, multicast delivery is to be performed, a video delivery port cannot be acquired from the control information alone. Therefore, the communication control device 105 sorts received RTP packets according to a video delivery destination port number included in the received RTP packet, measures the delivery quality of each RTP packet, and stores the results of measurement in the quality measurement information table 900.

The communication control device 105 references the header of each received RTP packet to acquire the sequence number of each received RTP packet (step 403).

The communication control device 105 references the header of each received RTP packet to acquire the timestamp of each received RTP packet (step 404).

The communication control device 105 acquires the reception time of each received RTP packet (step 405). For example, the reception time of each RTP packet is stored in the main memory 202 or the like. The communication control device 105 can acquire the RTP packet reception time by reading it from the main memory 202.

The communication control device 105 uses the acquired RTP packet sequence numbers to check for packet loss (step 406).

The communication control device 105 uses the acquired RTP packet timestamps and reception times to calculate packet latency and packet jitter (step 407).

The communication control device 105 judges whether or not to continue with delivery quality measurement (step 408). More specifically, the communication control device 105 references the control information table 800 and checks for an entry that matches the RTP packets (video data packets) to be measured. If there is no entry that matches the RTP packets (video data packets) to be measured, the communication control device 105 concludes that the delivery quality measurement should be completed.

If the judgment result obtained in step 408 indicates that the delivery quality measurement should be continued, the communication control device 105 returns to step 401 and performs steps 401 to 408.

If, on the other hand, the judgment result obtained in step 408 indicates that the delivery quality measurement should be completed without being continued, the communication control device 105 completes an RTP packet (video data packet) analysis process (step 409), and then terminates its process.

When the above process is completed, the results of delivery quality measurement are stored in the quality measurement information table 900.

FIG. 13 is a diagram illustrating an example of the quality measurement information table 900 according to an embodiment of the present invention.

The quality measurement information table 900 stores the results of unicast or multicast delivery quality measurement of video data packets to be measured.

The quality measurement information table 900 contains video data packet identification information 901 and delivery quality information 902.

The video data packet identification information 901 identifies the video data packets of specific video content to be subjected to delivery quality measurement.

The delivery quality information 902 represents the results of delivery quality measurement of the video data packets of specific video content that are identified by the video data packet identification information 901.

Lines 903 to 905 in FIG. 13 present the delivery quality information about each video data packet of specific video content.

The video data packet identification information 901 in line 903 shows a video data packet having a multicast address of 224.10.10.10, a video delivery server 102 IP address of 133.144.1.1, and a video delivery destination port number of 10234.

The delivery quality information 902 in line 903 indicates that the packet loss (LOSS) is 12 packets out of a total of 10005 packets, and that an average packet latency value (AVG_LATENCY) is 52 ms, and further that an average packet jitter value (AVG_JITTER) is 10 ms.

FIG. 14 is a flowchart illustrating in detail an RTP packet sorting process according to an embodiment of the present invention.

FIG. 14 depicts the details of the process performed in step 402, which is shown in FIG. 12.

From received RTP packets (video data packets), the communication control device 105 acquires the IP address of a sender (video delivery server 102) of the RTP packets, the IP address of a recipient (video receiver display device 107, 108) of the RTP packet, and a port number of the delivery destination (video receiver display device 107, 108) to which the RTP packets (video data packets) are to be delivered (step 1401).

The communication control device 105 references the quality measurement information table 900 and judges whether the quality measurement information table 900 contains an entry that is equal to the acquired information in the IP address of the sender (video delivery server 102) and the port number of the recipient (video receiver display device 107, 108) (step 1402).

If the judgment result obtained in step 1402 indicates that the quality measurement information table 900 contains an entry matching the information acquired in step 1401, the communication control device 105 proceeds to step 1405.

If, on the other hand, the judgment result obtained in step 1402 does not indicate that the quality measurement information table 900 contains an entry matching the information acquired in step 1401, the communication control device 105 creates a new entry (step 1403) in accordance with the information acquired in step 1401.

More specifically, the communication control device 105 stores the IP address of the RTP packet (video data packet) sender (video delivery server 102), the IP address of the RTP packet (video data packet) recipient (video receiver display device 107, 108), and the port number of the RTP packet (video data packet) recipient (video receiver display device 107, 108) as the video data packet identification information 901 in the quality measurement information table 900.

Next, the communication control device 105 generates a process for analyzing video data packets corresponding to the newly created entry (step 1404).

The communication control device 105 outputs the video data packets to be processed, namely, the video data packets corresponding to the newly created entry, to the generated analysis process, and then terminates its process (step 1405).

According to an embodiment of the present invention, the communication control device 105 acquires the control information transmitted from the video receiver display devices 107, 108. This allows the communication control device 105 to acquire information identifying the video data packets to be subjected to delivery quality measurement and start or end the delivery quality measurement of the identified video data packets.

Consequently, the communication control device 105 can identify the video data packets to be measured and make delivery quality measurements without acquiring from a user premises device the information identifying a connection destination for video data packet reception.

Further, the quality of video data packet delivery between the video delivery server 102 and the communication control device 105 can be measured without changing existing protocols.

While the embodiments of the present invention have been described in connection with the delivery quality of video data packets, the present invention can be applied not only to the delivery quality of video data packets but also to the communication quality of various types of data.

It should be understood by those skilled in the art that various modifications, combinations, sub-combinations, and alterations may occur depending on design requirements and other factors insofar as they are within the scope of the appended claims or the equivalents thereof.

What is claimed is:

1. A communication control device that connects a first network to a second network, the communication control device comprising:
   a first processor;
   a first memory connected to the first processor; and
   a first network interface connected to the first processor;
   wherein the first network is connected to a delivery server that includes a second processor, a second memory connected to the second processor, and a second network interface connected to the second processor, and delivers data packets containing plural pieces of content;
   wherein the second network is connected to a plurality of computers that each include a third processor, a third memory connected to the third processor, and a third network interface connected to the third processor, and acquire the data packets from the delivery server; and
   wherein the communication control device acquires control information, which is to be transmitted to the delivery server in order to let the computers acquire the data packets from the delivery server, extracts computer identification information, which identifies the computers targeted for measuring the delivery quality of the data packets to be transmitted, and data packet identification information, which identifies the data packets to be measured and transmitted to the identified computers, from the acquired control information, and measures the delivery quality of the data packets targeted for measurement, which are to be transmitted to the identified computers, in accordance with the extracted computer identification information and the extracted data packet identification information.

2. The communication control device according to claim 1, wherein the delivery server transmits the data packets to a multicast address for transmitting the data packets to a plurality of delivery destinations;
   wherein the control information includes the multicast address and the address of a computer that has transmitted the control information; and
   wherein the communication control device judges whether the acquired control information is a "join" request for joining the multicast address, extracts the address of the computer as the computer identification information and the multicast address as the data packet identification information from the acquired control information when the acquired control information is judged to be a "join" request for joining the multicast address, judges whether the extracted multicast address has already been joined, acquires the data packets targeted for measurement in accordance with the extracted computer address and the extracted multicast address when the extracted multicast address is judged not to have been joined, and starts the measurement of the delivery quality of the acquired data packets targeted for measurement.

3. The communication control device according to claim 1, wherein the delivery server transmits the data packets to a multicast address for transmitting the data packets to a plurality of delivery destinations;
   wherein the control information includes the multicast address and the address of a computer that has transmitted the control information; and
   wherein the communication control device judges whether the acquired control information is a "leave" request for leaving the multicast address, extracts the address of the computer as the computer identification information and the multicast address as the data packet identification information from the acquired control information when the acquired control information is judged to be a "leave" request for leaving the multicast address, and terminates the measurement of the delivery quality of the data packets targeted for measurement that match the extracted computer identification information and the extracted multicast address.

4. The communication control device according to claim 3, wherein, when the control information acquired from any one of the plurality of computers is a "leave" request for leaving a first multicast address in a situation where the computers have joined the first multicast address, a check is performed to judge whether all the computers have left the first multicast address;
   wherein, when all the computers are not judged to have left the first multicast address, the delivery quality measurement of the data packets targeted for measurement that relate to the first multicast address continues; and
   wherein, when all the computers are judged to have left the first multicast address, the delivery quality measurement of the data packets targeted for measurement that relate to the first multicast address terminates.

5. The communication control device according to claim 1, wherein, when measuring the delivery quality of the data packets targeted for measurement, the communication control device, in accordance with the extracted computer identification information and the extracted data packet identification information, acquires the data packets targeted for measurement, extracts sorting information for sorting the acquired data packets targeted for measurement into predetermined processing units, sorts the data packets targeted for measurement in accordance with the extracted sorting information, and measures the delivery quality of each of the sorted data packets.

6. The communication control device according to claim 5, wherein the sorting information includes the address of the computer, the port number of the computer, and the address of the delivery server.

7. The communication control device according to claim 1, wherein the delivery server directly transmits the data packets to the address of the computer;
   wherein the control information includes the address of a computer that has transmitted the control information, the address of the delivery server, and a session identifier that identifies a session for exchanging information between the computer and the delivery server; and
   wherein the communication control device judges whether the control information is setup information necessary for the transmission of the data packets, extracts the address of the computer and the session identifier as the computer identification information and the address of the computer and the address of the delivery server as the data packet identification information from the control information when the control information is judged to be the setup information necessary for the transmission of the data packets, judges whether the control information is a request for starting the transmission of the data packets, starts the measurement of delivery quality of the data packets targeted for measurement when the control information is judged to be the request for starting the transmission of the data packets, judges whether the control information is a request for terminating the transmission of the data packets, and terminates the measurement of delivery quality of the data packets targeted for measurement when the control information is judged to be the request for terminating the transmission of the data packets.

8. The communication control device according to claim 1, wherein the delivery quality of the data packets targeted for measurement is the delivery quality of data packets transmitted from the delivery server to the communication control device through the first network, and at least one of packet loss, packet latency, and packet jitter.

9. A communication quality measurement method for use in a communication control device that includes a first processor, a first memory connected to the first processor, and a first network interface connected to the first processor, and connects a first network to a second network, the first network being connected to a delivery server that includes a second processor, a second memory connected to the second processor, and a second network interface connected to the second processor, and delivers data packets containing plural pieces of content, the second network being connected to a plurality of computers that each include a third processor, a third memory connected to the third processor, and a third network interface connected to the third processor, and acquire the data packets from the delivery server, the method comprising the steps of:
    causing the communication control device to acquire control information, which is to be transmitted to the delivery server in order to let the computers acquire the data packets from the delivery server;
    causing the communication control device to extract computer identification information, which identifies the computers targeted for measuring the delivery quality of the data packets to be transmitted, and data packet identification information, which identifies the data packets to be measured and transmitted to the identified computers, from the acquired control information; and
    causing the communication control device to measure the delivery quality of the data packets targeted for measurement, which are to be transmitted to the identified computers, in accordance with the extracted computer identification information and the extracted data packet identification information.

10. The communication quality measurement method according to claim 9,
    wherein the delivery server transmits the data packets to a multicast address for transmitting the data packets to a plurality of delivery destinations; and
    wherein the control information includes the multicast address and the address of a computer that has transmitted the control information, the method comprising the steps of:
    causing the communication control device to judge whether the acquired control information is a "join" request for joining the multicast address;
    causing the communication control device to extract the address of the computer as the computer identification information and the multicast address as the data packet identification information from the acquired control information when the acquired control information is judged to be a "join" request for joining the multicast address;
    causing the communication control device to judge whether the extracted multicast address has already been joined;
    causing the communication control device to acquire the data packets targeted for measurement in accordance with the extracted computer address and the extracted multicast address when the extracted multicast address is judged not to have been joined; and
    starting to measure the delivery quality of the acquired data packets targeted for measurement.

11. The communication quality measurement method according to claim 9,
    wherein the delivery server transmits the data packets to a multicast address for transmitting the data packets to a plurality of delivery destinations; and
    wherein the control information includes the multicast address and the address of a computer that has transmitted the control information, the method comprising the steps of:
    causing the communication control device to judge whether the acquired control information is a "leave" request for leaving the multicast address;
    causing the communication control device to extract the address of the computer as the computer identification information and the multicast address as the data packet identification information from the acquired control information when the acquired control information is judged to be a "leave" request for leaving the multicast address; and
    causing the communication control device to terminate the measurement of the delivery quality of the data packets targeted for measurement that match the extracted computer identification information and the extracted multicast address.

12. The communication quality measurement method according to claim 11, further comprising the steps of:
    when the control information acquired from any one of the plurality of computers is a "leave" request for leaving a first multicast address in a situation where the computers have joined the first multicast address, causing the communication control device to judge whether all the computers have left the first multicast address;
    when all the computers are not judged to have left the first multicast address, causing the communication control device to continue with the delivery quality measurement of the data packets targeted for measurement that relate to the first multicast address; and
    when all the computers are judged to have left the first multicast address, causing the communication control device to terminate the delivery quality measurement of the data packets targeted for measurement that relate to the first multicast address.

13. The communication quality measurement method according to claim 9, wherein, when measuring the delivery quality of the data packets targeted for measurement, in accordance with the extracted computer identification information and the extracted data packet identification information, the communication control device performs the steps of:
    acquiring the data packets targeted for measurement;
    extracting sorting information for sorting the acquired data packets targeted for measurement into predetermined processing units;
    sorting the data packets targeted for measurement in accordance with the extracted sorting information; and
    measuring the delivery quality of each of the sorted data packets.

14. The communication quality measurement method according to claim 13, wherein the sorting information includes the address of the computer, the port number of the computer, and the address of the delivery server.

15. The communication quality measurement method according to claim 9,
    wherein the delivery server directly transmits the data packets to the address of the computer; and
    wherein the control information includes the address of a computer that has transmitted the control information, the address of the delivery server, and a session identifier that identifies a session for exchanging information between the computer and the delivery server, the method further comprising the steps of:

causing the communication control device to judge whether the control information is setup information necessary for the transmission of the data packets;

causing the communication control device to extract the address of the computer and the session identifier as the computer identification information and the address of the computer and the address of the delivery server as the data packet identification information from the control information when the control information is judged to be the setup information necessary for the transmission of the data packets;

causing the communication control device to judge whether the control information is a request for starting the transmission of the data packets;

causing the communication control device to start the measurement of delivery quality of the data packets targeted for measurement when the control information is judged to be the request for starting the transmission of the data packets;

causing the communication control device to judge whether the control information is a request for terminating the transmission of the data packets; and causing the communication control device to terminate the measurement of delivery quality of the data packets targeted for measurement when the control information is judged to be the request for terminating the transmission of the data packets.

16. The communication quality measurement method according to claim 9, wherein the delivery quality of the data packets targeted for measurement is the delivery quality of data packets transmitted from the delivery server to the communication control device through the first network, and at least one of packet loss, packet latency, and packet jitter.

* * * * *